US012457630B2

(12) United States Patent
Gupta et al.

(10) Patent No.: US 12,457,630 B2
(45) Date of Patent: Oct. 28, 2025

(54) ENERGY-STATE FEEDBACK FOR EFFICIENT WIRELESS POWER TRANSFER TO IOT DEVICES

(71) Applicant: QUALCOMM Incorporated, San Diego, CA (US)

(72) Inventors: Piyush Gupta, Bridgewater, NJ (US); Xiaojie Wang, Hillsborough, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 17/669,068

(22) Filed: Feb. 10, 2022

(65) Prior Publication Data

US 2023/0254886 A1     Aug. 10, 2023

(51) Int. Cl.
| | |
|---|---|
| *H04W 72/12* | (2023.01) |
| *H02J 13/00* | (2006.01) |
| *H02J 50/00* | (2016.01) |
| *H02J 50/80* | (2016.01) |
| *H04W 72/542* | (2023.01) |

(52) U.S. Cl.
CPC ..... *H04W 72/542* (2023.01); *H02J 13/00002* (2020.01); *H02J 50/001* (2020.01); *H02J 50/80* (2016.02)

(58) Field of Classification Search
CPC .... H02J 13/00002; H02J 50/001; H02J 50/20; H02J 50/80; H02J 50/40; H04W 28/022; H04W 72/21; H04W 72/542
USPC ........................................................ 370/329
See application file for complete search history.

(56) References Cited

U.S. PATENT DOCUMENTS

| | | | | |
|---|---|---|---|---|
| 2020/0336185 | A1* | 10/2020 | Lee | H02J 50/90 |
| 2021/0021304 | A1* | 1/2021 | Yoshida | H02J 50/001 |
| 2021/0099107 | A1* | 4/2021 | Yoshida | H04L 7/0008 |
| 2021/0393968 | A1* | 12/2021 | Monson | H02J 50/001 |
| 2022/0166251 | A1* | 5/2022 | Harish Gopala Pillai | H02J 50/001 |
| 2022/0225402 | A1* | 7/2022 | Elkotby | H04W 74/004 |
| 2022/0346022 | A1* | 10/2022 | Butt | H04W 52/0251 |
| 2022/0352751 | A1* | 11/2022 | Elshafie | H02J 50/23 |
| 2023/0014594 | A1 | 1/2023 | Lee et al. | |

(Continued)

FOREIGN PATENT DOCUMENTS

| | | |
|---|---|---|
| KR | 102348248 B1 | 1/2022 |
| WO | WO-2021087966 A1 | 5/2021 |

OTHER PUBLICATIONS

International Search Report and Written Opinion—PCT/US2023/061296—ISA/EPO—Apr. 20, 2023.

*Primary Examiner* — Robert J Lopata
(74) *Attorney, Agent, or Firm* — Holland & Hart LLP

(57) ABSTRACT

Methods, systems, and devices for wireless communications are described. For instance, a first wireless device may transmit, to a second wireless device, a first signal for probing an energy state of the second wireless device. The first wireless device may monitor for a second, backscattered signal indicating the energy state of the second wireless device and may transmit, to the second wireless device, an indication of resources for harvesting energy based on monitoring for the second, backscattered signal. The first wireless device may transmit, to the second wireless device and over the resources, a third signal distinct from the first signal and associated with harvesting energy.

32 Claims, 16 Drawing Sheets

(56) References Cited

U.S. PATENT DOCUMENTS

2023/0031981 A1\* 2/2023 Yehezkely ............... H02J 50/80
2024/0006914 A1\* 1/2024 Ickin .................... H02J 50/001

\* cited by examiner

ENERGY-STATE FEEDBACK FOR EFFICIENT WIRELESS POWER TRANSFER TO IOT DEVICES

FIELD OF TECHNOLOGY

The following relates to wireless communications, including energy-state feedback for wireless power transfer.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a wireless device may perform energy harvesting. For instance, the wireless device may receive a first signal scheduling resources for harvesting energy and may also receive a second signal over such resources from which the wireless device may harvest energy. However, transmitting such signals over resources may reduce a total number of resources available for communicating information, which may reduce the efficiency of wireless communications.

SUMMARY

The described techniques relate to improved methods, systems, devices, and apparatuses that support energy-state feedback for wireless power transfer. Generally, the described techniques provide for a reduction in a number of resources explicitly used for indicating resources for wireless power transfer and/or for communicating a wireless power transfer signal, which may increase the efficiency of wireless communications. For instance, a first wireless device may transmit, to a second wireless device, a first signal for probing an energy state of the second wireless device. The first wireless device may monitor for a second, backscattered signal indicating the energy state of the second wireless device and may transmit, to the second wireless device, an indication of resources for harvesting energy based on monitoring for the second, backscattered signal. The first wireless device may transmit, to the second wireless device and over the resources, a third signal distinct from the first signal and associated with harvesting energy.

A method for wireless communication at a first wireless device is described. The method may include receiving, from a second wireless device, a first signal, transmitting, based on receiving the first signal, a second signal to the second wireless device, where an energy for transmitting the second signal is derived from the first signal, and where the second signal indicates an energy state of the first wireless device, and receiving, from the second wireless device, an indication of resources for harvesting energy based on transmitting the second signal that indicates the energy state of the first wireless device.

An apparatus for wireless communication at a first wireless device is described. The apparatus may include a processor, memory coupled with the processor, and instructions stored in the memory. The instructions may be executable by the processor to cause the apparatus to receive, from a second wireless device, a first signal, transmit, based on receiving the first signal, a second signal to the second wireless device, where an energy for transmitting the second signal is derived from the first signal, and where the second signal indicates an energy state of the first wireless device, and receive, from the second wireless device, an indication of resources for harvesting energy based on transmitting the second signal that indicates the energy state of the first wireless device.

Another apparatus for wireless communication at a first wireless device is described. The apparatus may include means for receiving, from a second wireless device, a first signal, means for transmitting, based on receiving the first signal, a second signal to the second wireless device, where an energy for transmitting the second signal is derived from the first signal, and where the second signal indicates an energy state of the first wireless device, and means for receiving, from the second wireless device, an indication of resources for harvesting energy based on transmitting the second signal that indicates the energy state of the first wireless device.

A non-transitory computer-readable medium storing code for wireless communication at a first wireless device is described. The code may include instructions executable by a processor to receive, from a second wireless device, a first signal, transmit, based on receiving the first signal, a second signal to the second wireless device, where an energy for transmitting the second signal is derived from the first signal, and where the second signal indicates an energy state of the first wireless device, and receive, from the second wireless device, an indication of resources for harvesting energy based on transmitting the second signal that indicates the energy state of the first wireless device.

Some examples of the method, apparatuses, and non-transitory computer-readable medium described herein may further include operations, features, means, or instructions for transmitting the second signal based on the energy state being above a threshold level.

In some examples of the method, apparatuses, and non-transitory computer-readable medium described herein, the first signal may be received over a first frequency band and the indication of resources for harvesting energy may be received over a second frequency band that excludes the first frequency band.

In some examples of the method, apparatuses, and non-transitory computer-readable medium described herein, the first signal may be received over a same frequency band as the indication of resources for harvesting energy.

Some examples of the method, apparatuses, and non-transitory computer-readable medium described herein may further include operations, features, means, or instructions for receiving, from the second wireless device, a first message scheduling an uplink resource and transmitting, to the second wireless device, a second message over the uplink resource and indicating a second energy state of the first wireless device.

In some examples of the method, apparatuses, and non-transitory computer-readable medium described herein, the first wireless device includes an Internet of Things (IoT) wireless device and the second wireless device includes a base station.

In some examples of the method, apparatuses, and non-transitory computer-readable medium described herein, the first wireless device includes a user equipment (UE).

A method for wireless communication at a first wireless device is described. The method may include transmitting, to a second wireless device, a first signal for probing an energy state of the second wireless device, monitoring for a second, backscattered signal indicating the energy state of the second wireless device, transmitting, to the second wireless device, an indication of resources for harvesting energy based on monitoring for the second, backscattered signal, and transmitting, to the second wireless device and over the resources, a third signal distinct from the first signal and associated with harvesting energy.

An apparatus for wireless communication at a first wireless device is described. The apparatus may include a processor, memory coupled with the processor, and instructions stored in the memory. The instructions may be executable by the processor to cause the apparatus to transmit, to a second wireless device, a first signal for probing an energy state of the second wireless device, monitor for a second, backscattered signal indicating the energy state of the second wireless device, transmit, to the second wireless device, an indication of resources for harvesting energy based on monitoring for the second, backscattered signal, and transmit, to the second wireless device and over the resources, a third signal distinct from the first signal and associated with harvesting energy.

Another apparatus for wireless communication at a first wireless device is described. The apparatus may include means for transmitting, to a second wireless device, a first signal for probing an energy state of the second wireless device, means for monitoring for a second, backscattered signal indicating the energy state of the second wireless device, means for transmitting, to the second wireless device, an indication of resources for harvesting energy based on monitoring for the second, backscattered signal, and means for transmitting, to the second wireless device and over the resources, a third signal distinct from the first signal and associated with harvesting energy.

A non-transitory computer-readable medium storing code for wireless communication at a first wireless device is described. The code may include instructions executable by a processor to transmit, to a second wireless device, a first signal for probing an energy state of the second wireless device, monitor for a second, backscattered signal indicating the energy state of the second wireless device, transmit, to the second wireless device, an indication of resources for harvesting energy based on monitoring for the second, backscattered signal, and transmit, to the second wireless device and over the resources, a third signal distinct from the first signal and associated with harvesting energy.

Some examples of the method, apparatuses, and non-transitory computer-readable medium described herein may further include operations, features, means, or instructions for transmitting a set of multiple probing signals to the second wireless device, where transmitting the indication of the resources for harvesting energy may be based on a quantity of probing signals in the plurality being above a threshold quantity and failing to detect a respective backscattered signal for each of the set of multiple probing signals.

Some examples of the method, apparatuses, and non-transitory computer-readable medium described herein may further include operations, features, means, or instructions for transmitting the indication of resources for harvesting energy based on an energy state indicated by the second signal being below a threshold level.

Some examples of the method, apparatuses, and non-transitory computer-readable medium described herein may further include operations, features, means, or instructions for transmitting the indication of resources for harvesting energy based on a traffic profile for a network associated with the first wireless device and the second wireless device.

Some examples of the method, apparatuses, and non-transitory computer-readable medium described herein may further include operations, features, means, or instructions for transmitting the indication of resources for harvesting energy based on a type of traffic associated with the second wireless device.

Some examples of the method, apparatuses, and non-transitory computer-readable medium described herein may further include operations, features, means, or instructions for transmitting a second indication of resources for harvesting energy based on channel feedback associated with the second wireless device, one or more scheduled transmissions from the first wireless device, or both.

In some examples of the method, apparatuses, and non-transitory computer-readable medium described herein, the first signal may be transmitted over a first frequency band and the third signal may be transmitted over a second frequency band that excludes the first frequency band.

In some examples of the method, apparatuses, and non-transitory computer-readable medium described herein, the first signal may be transmitted over a same frequency band as the third signal.

A first wireless device is described. The first wireless device may include a first circuit configured to transmit, to a second wireless device, a first signal for probing an energy state of the second wireless device and to monitor for a second, backscattered signal indicating the energy state of the second wireless device. The first wireless device may include a second circuit configured to transmit, to the second wireless device, an indication of resources for harvesting energy based at least in part on monitoring for the second, backscattered signal and to transmit a third signal over the resources that is distinct from the first signal and associated with harvesting energy.

In some examples, the first wireless device may be configured to transmit the second signal based at least in part on the energy state being above a threshold level.

In some examples, the first circuit may be configured to receive the first signal over a first frequency band the second circuit may be configured to receive the indication of resources for harvesting energy over a second frequency band that excludes the first frequency band.

In some examples, the first circuit may be configured to receive the first signal over a same frequency band that the second circuit is configured to receive the indication of resources.

In some examples, the second circuit may be configured to receive, from the second wireless device, a first message scheduling an uplink resources and to transmit, to the second wireless device, a second message over the uplink resources and indicating a second energy state of the first wireless device.

In some examples, the first wireless device may include an IoT wireless device and the second wireless device may include a base station.

In some examples, the IoT wireless device may include a UE.

A first wireless device is described. The first wireless device may include a first circuit configured to transmit, to a second wireless device, a first signal for probing an energy state of the second wireless device and to monitor for a second, backscattered signal indicating the energy state of the second wireless device. The first wireless device may include a second circuit configured to transmit, to the second wireless device, an indication of resources for harvesting energy based at least in part on monitoring for the second, backscattered signal and to transmit a third signal over the resources that is distinct from the first signal and associated with harvesting energy.

In some examples, the first circuit may be configured to transmit a plurality of probing signals to the second wireless device, where transmitting the indication of the resources for harvesting energy is based at least in part on a quantity of probing signals in the plurality being above a threshold quantity and failing to detect a respective backscattered signal for each of the plurality of probing signals.

In some examples, the second circuit may be configured to transmit the indication of resources for harvesting energy based at least in part on an energy state indicated by the second signal being below a threshold level.

In some examples, the second circuit may be configured to transmit the indication of resources for harvesting energy based at least in part on a traffic profile associated with communication between the first wireless device and the second wireless device.

In some examples, the first circuit may be configured to transmit the first signal over a first frequency band and the second circuit is configured to transmit the third signal over a second frequency band that excludes the first frequency band.

In some examples, the first circuit may be configured to transmit the first signal over a same frequency band that the second circuit is configured to transmit the third signal.

In some examples, the first wireless device may include a base station and the second wireless device may include an IoT wireless device.

In some examples, the second wireless device includes a UE.

DETAILED DESCRIPTION

A node (e.g., a base station, an energy node (EN), a hybrid access point (HAP)) may transmit a signal to an Internet of Things (IoT) device, such as a user equipment (UE). In some examples, the IoT device may harvest energy from the signal. However, in order for the IoT device to harvest the energy, the node may provide signaling indicating to the IoT device resources for receiving a wireless power transfer (WPT) signal and may transmit the WPT signal over the indicated resources. The signaling scheduling the resources and/or the WPT signal itself may take up resources that may have instead been used for information transfer. As fewer resources may be available for information transfer, the rate at which information is transferred may decrease and the efficiency of wireless communications may accordingly decrease.

The present disclosure describes techniques that may enable the IoT device to receive scheduled WPT transmissions when an energy level of the IoT device is below an energy threshold and to perform opportunistic energy harvesting when the energy level is above the energy threshold. Opportunistic energy harvesting may, for instance, include harvesting energy from signals that are scheduled for other devices besides the IoT device (e.g., transmissions to the node from other devices or from the node to other devices). In some examples, the IoT device may request a scheduled WPT transmission by providing energy state (ES) feedback. For instance, the IoT device may receive a probing signal from the node. If an energy level of the IoT device is above the energy threshold, the IoT device may transmit a first backscattered signal. However, if the energy level of the IoT device is below the energy threshold, the IoT device may refrain from transmitting a backscattered signal or may transmit a second backscattered signal distinct from the first backscattered signal. If the node receives the first backscattered signal, the node may not schedule resources explicitly directed towards the IoT device for energy harvesting. However, if the node fails to receive a backscattered signal or receives the second backscattered signal, the node may schedule resources explicitly directed towards the IoT device for energy harvesting. The number of instances with which the node schedules resources explicitly directed towards the IoT device for energy harvesting may decrease according to this scheme in at least some examples. Accordingly, the efficiency of wireless communications may increase.

Aspects of the disclosure are initially described in the context of wireless communications systems. Additional aspects of the disclosure are described in the context of a backscattering scheme and a process flow. Aspects of the disclosure are further illustrated by and described with reference to apparatus diagrams, system diagrams, and flowcharts that relate to energy-state feedback for wireless power transfer.

Figure 1:
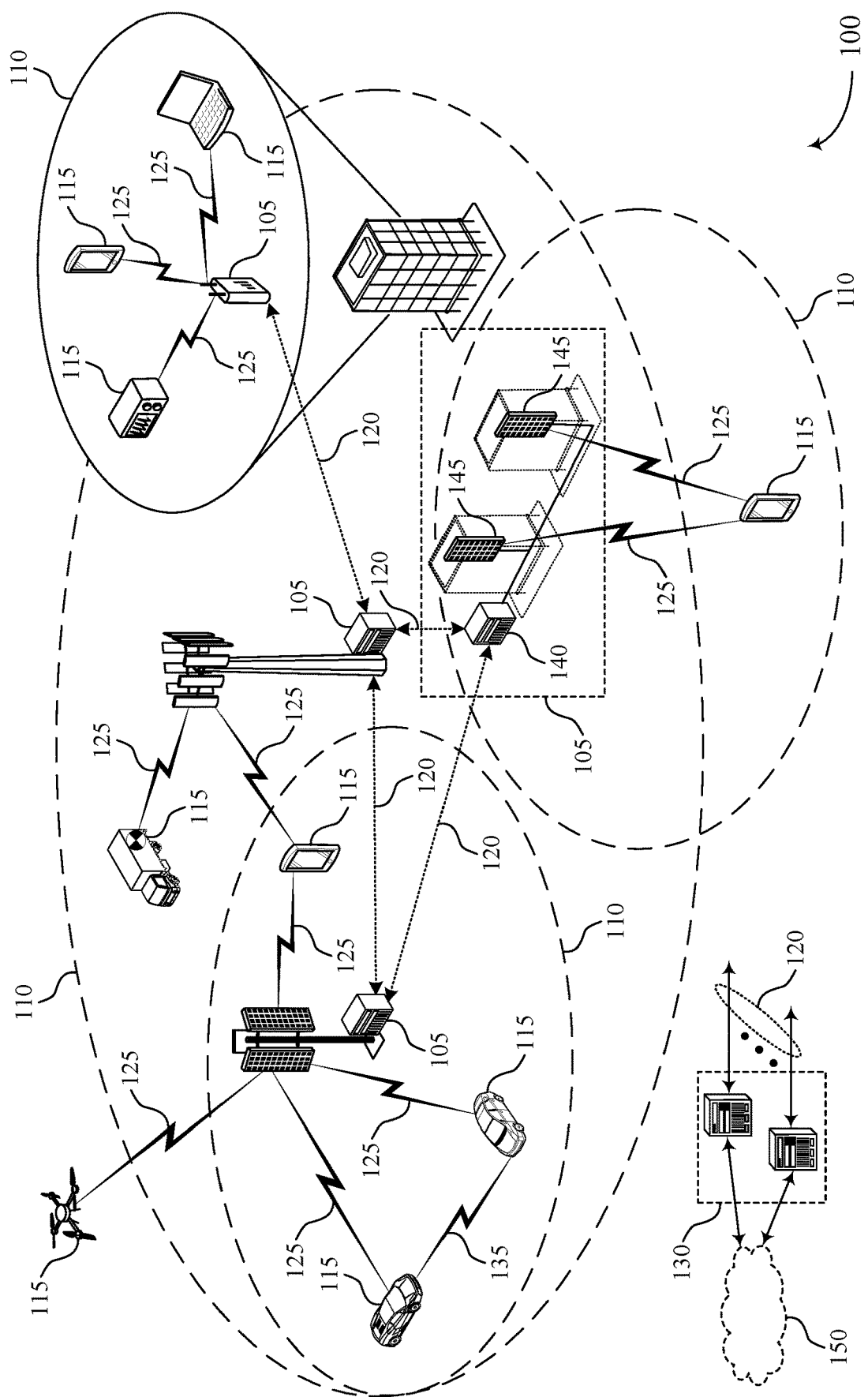
FIG. 1 illustrates an example of a wireless communications system that supports energy-state feedback for wireless power transfer in accordance with aspects of the present disclosure.

FIG. 1 illustrates an example of a wireless communications system 100 that supports energy-state feedback for wireless power transfer in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and Nr may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A node (e.g., a base station 105, an EN, a HAP) may transmit a signal to an IoT device, such as a UE 115. In some examples, the IoT device may harvest energy from the signal. However, in order for the IoT device to harvest the energy, the node may provide signaling indicating to the IoT device resources for receiving a WPT signal and may also transmit the WPT signal over the indicated resources. The signaling scheduling the resources and/or the WPT signal itself may take up resources that may have instead been used for information transfer. As fewer resources may be available for information transfer, the rate at which information is transferred may decrease and the efficiency of wireless communications may accordingly decrease.

The present disclosure describes techniques that may enable the IoT device to receive scheduled WPT transmissions when an energy level of the IoT device is below an energy threshold and to perform opportunistic energy harvesting when the energy level is above the energy threshold. Opportunistic energy harvesting may, for instance, include harvesting energy from signals that are scheduled for other devices besides the IoT device (e.g., transmissions to the node from other devices or from the node to other devices). In some examples, the IoT device may request a scheduled WPT transmission by providing energy state (ES) feedback. For instance, the IoT device may receive a probing signal from the node. If an energy level of the IoT device is above the energy threshold, the IoT device may transmit a first backscattered signal. However, if the energy level of the IoT device is below the energy threshold, the IoT device may refrain from transmitting a backscattered signal or may transmit a second backscattered signal distinct from the first backscattered signal. If the node receives the first backscattered signal, the node may not schedule resources explicitly directed towards the IoT device for energy harvesting. However, if the node fails to receive a backscattered signal or receives the second backscattered signal, the node may schedule resources explicitly directed towards the IoT device for energy harvesting. The number of instances with which the node schedules resources explicitly directed towards the IoT device for energy harvesting may decrease according to this scheme in at least some examples. Accordingly, the efficiency of wireless communications may increase.

Figure 2:
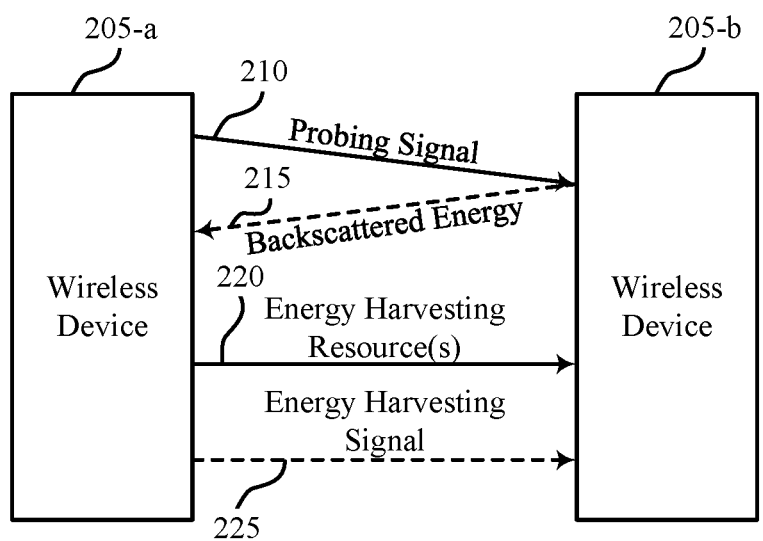
FIG. 2 illustrates an example of a wireless communications system that supports energy-state feedback for wireless power transfer in accordance with aspects of the present disclosure.

FIG. 2 illustrates an example of a wireless communications system 200 that supports energy-state feedback for wireless power transfer in accordance with aspects of the present disclosure. In some examples, wireless device 205-a may be an example of a base station (e.g., a base station 105 as described with reference to FIG. 1), an energy node (EN), or a hybrid access point (HAP) (e.g., an access point that acts as both a base station and an EN). Additionally, or alternatively, wireless device 205-b may be an example of a UE (e.g., a UE 115 as described with reference to FIG. 1), an Internet of Things (IoT) device (e.g., a wireless powered IoT (WP-IoT) device).

In some examples, wireless device 205-a may perform wireless power transfer (WPT) to wireless device 205-b. In some such examples, wireless device 205-b may perform energy harvesting (EH) using a signal received from a radio frequency (RF) transmitter of wireless device 205-a. In some examples, performing EH may enable a battery of wireless device 205-b to be replaced less frequently as compared to examples in which wireless device 205-b does not perform EH. Additionally, performing EH may be associated with more consistent and/or more predictable energy gain as compared to renewable energy sources (e.g., solar, wind, tidal, hydroelectric). Multiple types of WP-IT may be employed. For instance, wireless devices 205-a and 205-b may employ simultaneous wireless information and power transfer (SWIPT), in which RF signals are used to jointly transfer information and provide energy for energy harvesting (e.g., using the same waveform). Alternatively, wireless devices 205-a and 205-b may employ bistatic wireless information and power transfer, in which dedicated EN or HAPs perform WPT to WP-IoT devices.

In some examples, WPT-enabled wireless sensor networks may have reduced manual battery replacement and/or a longer lifetime as compared to WPT-disabled wireless sensor networks. Additionally, or alternatively, WPT-enabled active radio frequency identifier (RFID) may have a better range as compared to passive RFID and energy may be gathered over a longer duration as compared to information transfer implementations.

In some examples, wireless device 205-a (e.g., a base station, an access point, an EN) may schedule an explicit transmission for WPT. However, the signal scheduling the transmission and/or the energy signal for WPT may use resources (e.g., bandwidth, power) which may otherwise have been used for information transfer. As such, the latency associated with information transfer may increase. In some examples, WP-IoT devices (e.g., wireless device 205-b) may have energy storage capabilities (e.g., rechargeable batteries, supercapacitors).

The present disclosure may describe techniques that make WPT operation (e.g., for WP-IoT devices with energy storage) more efficient. For instance, wireless device 205-b may perform EH when wireless device 205-a is transmitting signaling for information transfer to other WP-IoT devices and/or other UEs. For instance, a transmit beam of wireless device 205-a for a WP-IoT device other than wireless device 205-b may include wireless device 205-b (e.g., a HAP transmitting to a first wireless device may enable EH at a second wireless device). In some such examples, wireless device 205-a may be transmitting to WP-IoT UEs, enhanced mobile broadband (eMBB) UEs, ultra-reliable low-latency communications UEs 115, or any combination thereof when EH at wireless device 205-b occurs. The EH circuit at wireless device 205-b may be tuned and/or impedance matched to a bandwidth of operation for communications from wireless device 205-a. In some examples, opportunistic EH may occur during uplink from eMBB UEs, URLLC UEs, WP-IoT UEs, or any combination thereof. For instance, a UE within a threshold distance from wireless device 205-b may generate a beamformed transmission, where the beam may include wireless device 205-b. Accordingly, wireless device 205-b may harvest energy from the beamformed transmission. Opportunistic EH may also be from other sources (e.g., ambient RF sources such as Wi-Fi or non-RF sources such as solar, wind, tidal, hydroelectric, or vibrations).

In some examples, wireless device 205-a may perform explicit WPT transmissions for wireless device 205-b (e.g., transmissions scheduled for energy transfer for wireless device 205-b) when an energy state of wireless device 205-b fails to satisfy a threshold. For instance, wireless device 205-b may provide feedback of its energy state to wireless device 205-a, which wireless device 205-a may use to determine whether to transmit an explicit WPT transmission to wireless device 205-b. In some examples, energy state (ES) feedback may be provided by one or more bits. For instance, ES feedback may include one bit that indicates whether an energy level of wireless device 205-b is above a predefined threshold.

In some examples, ES feedback may be sent via backscattering (e.g., wireless device 205-a may probe wireless device 205-a and wireless device 205-b may backscatter based on its energy state). For instance, wireless device 205-*a* may transmit probing signal 210 to wireless device 205-*b* and wireless device 205-*b* may transmit backscattered energy 215 based on an energy state of wireless device 205-*b*. In some examples, wireless device 205-*b* may transmit backscattered energy 215 in examples in which an energy level of wireless device 205-*b* is above the predefined threshold and may refrain from transmitting backscattered energy 215 in examples in which an energy level of wireless device 205-*b* is below the predefined threshold. In some such examples, wireless device 205-*a* may determine that the energy level of wireless device 205-*b* is below the predefined threshold when failing to receive backscattered energy from wireless device 205-*b* after transmitting a quantity (e.g., X) of successive probing signals (e.g., where X>0)) and may perform explicit WPT transmissions accordingly. For instance, if failing to receive backscattered energy after transmitting X successive probing signals, wireless device 205-*a* may transmit EH resources 220 to UE 115-*b* and may transmit EH signal 225 over the indicated EH resources 220. In other examples (e.g., examples in which more than two bits are used to convey an energy level of wireless device 205-*b*), an amount of energy of backscattered energy 215 may be used by wireless device 205-*a* to determine whether or not the energy level of wireless device 205-*b* is below the predefined threshold.

In some examples, a first circuit of wireless device 205-*b* may be used to receive the probing signal 210 and/or to transmit the backscattered energy 215, whereas a second circuit may be used to receive the EH resources 220 and/or the EH signal 225. Additionally, or alternatively, a respective first circuit of wireless device 205-*a* may be used to transmit the probing signal 210 and/or to receive the backscattered energy 215, whereas a second circuit may be used to transmit the EH resources 220 and/or the EH signal 225. In other examples, one circuit of wireless device 205-*b* may be used to receive the probing signal, transmit the backscattered energy, and to receive the EH signal 225. Additionally, or alternatively, one circuit of wireless device 205-*a* may be used to transmit the probing signal, receive the backscattered energy, and to transmit the EH signal 225.

In some examples, ES feedback may be included in a scheduled uplink transmission (e.g., an uplink transmission that includes data for wireless device 205-*a* distinct from the ES feedback along with the ES feedback). For instance, the ES feedback may be included with each nth periodic sensor reading (e.g., where n>0).

In some examples, an energy state of wireless device 205-*b* may be implicitly estimated at wireless device 205-*a*. For instance, based on channel state feedback from wireless device 205-*b* and EH parameters, wireless device 205-*a* may determine potential EH at wireless device 205-*b* from its scheduled transmissions (e.g., scheduled transmissions to wireless device 205-*b* or to other wireless devices). Accordingly, wireless device 205-*a* may determine if and/or when to perform explicit WPT transmissions (e.g., in conjunction with information on a traffic profile). For periodic traffic (e.g. traffic associated with temperature sensing), wireless device 205-*a* may schedule wireless device 205-*b* if wireless device 205-*b* is determined by wireless device 205-*a* to be energy deficient and/or below an energy level threshold for a next scheduled sensing and corresponding uplink transmission. Additionally or alternatively (e.g., for event-driven traffic, such as an alarm), wireless device 205-*a* may perform WPT transmissions to maintain a particular reserve level at wireless device 205-*b*. Additionally or alternatively (e.g., for dynamic traffic), wireless device 205-*a* may perform WPT transmissions before scheduling uplink transmissions at wireless device 205-*b* on receiving a BSR report of wireless device 205-*b*.

By using opportunistic EH when an energy level of wireless device 205-*b* is above a predefined threshold and/or using explicit WPT transmissions when the energy level of wireless device is below the predefined threshold, a number of resources used for scheduling explicit WPT transmissions and/or for transmitting explicit WPT transmissions may be reduced as compared to schemes in which explicit WPT transmissions are used regardless of an energy level of wireless device. Accordingly, resource efficiency may increase and a latency associated with transferring information may be reduced. Thus, the efficiency of wireless communications may increase.

Figure 3:
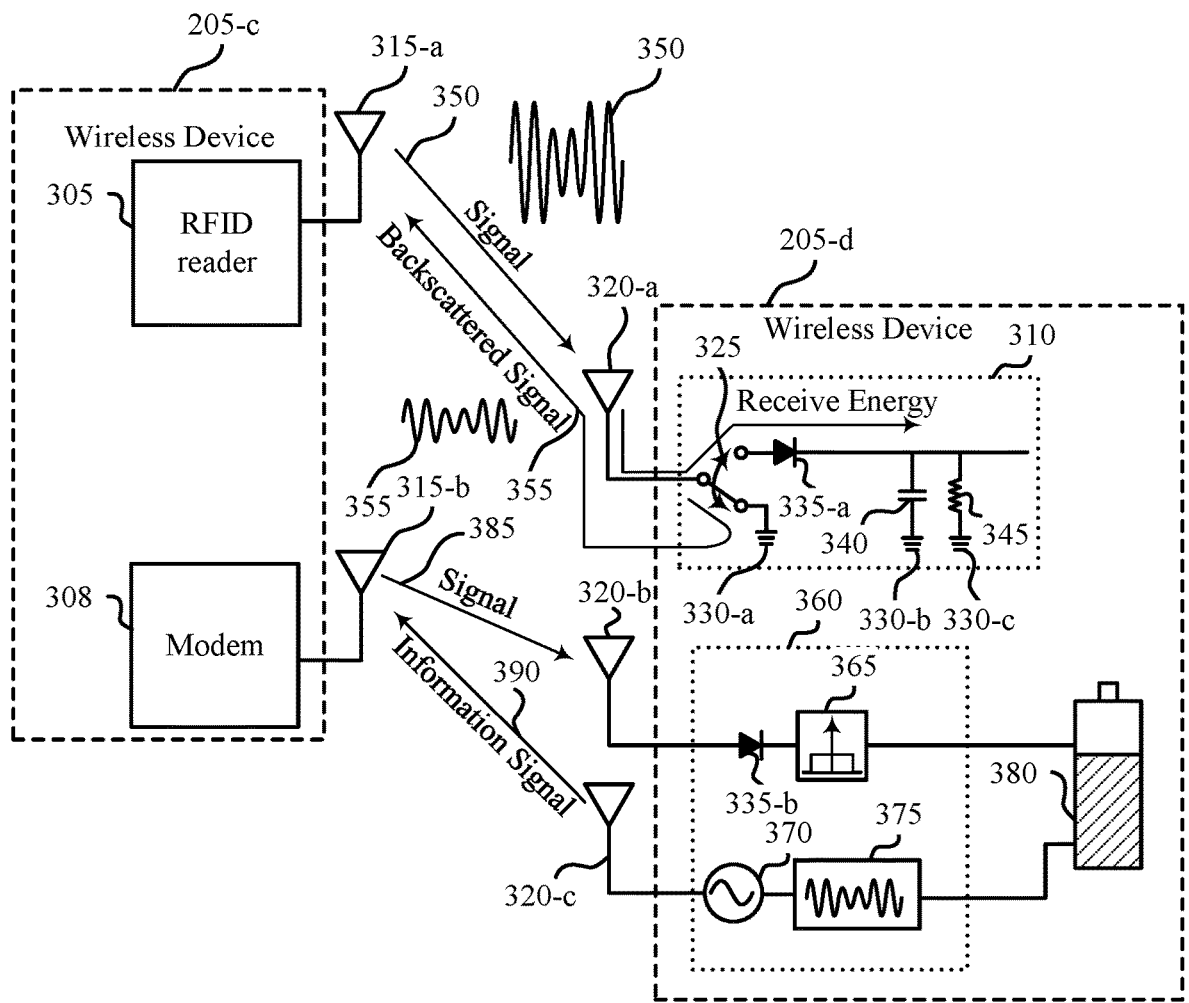
FIG. 3 illustrates an example of a backscattering scheme that supports energy-state feedback for wireless power transfer in accordance with aspects of the present disclosure.

FIG. 3 illustrates an example of a backscattering scheme 300 that supports energy-state feedback for wireless power transfer in accordance with aspects of the present disclosure. In some examples, backscattering scheme 300 may be implemented by one or more aspects of wireless communications system 200. For instance, wireless device 205-*c* may be an example of a wireless device 205-*a* as described with reference to FIG. 2 and wireless device 205-*d* may be an example of a wireless device 205-*b* as described with reference to FIG. 2. Additionally, or alternatively, signal 350 may be an example of a probing signal 210 as described with reference to FIG. 2 and backscattered signal 355 may be an example of backscattered energy 215 as described with reference to FIG. 2.

Wireless device 205-*c* may include an RFID reader 305 or modem 308. Wireless device 205-*c* may include RF elements 315-*a* and 315-*b* (e.g., antennas, sets of antennas, sets of antenna elements, antenna arrays) coupled with the RFID reader 305 and modem 308. In some cases, wireless device 205-*c* may include a single RF element 315 coupled with both RFID reader 305 and modem 308. Wireless device 205-*d* may include (e.g., in an RFID tag of wireless device 205-*d*) a first circuit 310, a second circuit 360, an RF elements 320-*a* (e.g., an antenna, a set of antennas, a set of antenna elements, an antenna array) coupled with the first circuit 310, and RF elements 320-*b* and 320-*c* coupled with second circuit 360. First circuit 310 may include a switch 325; grounds 330-*a*, 330-*b*, and 330-*c*; diode element 335-*a*, capacitor 340; and resistor 345. FIG. 3 may illustrate a simplified diagram of circuit 310, and circuit 310 may include additional elements (e.g., transistors, inductors, others capacitors, other resistors) in other configurations to perform the functions of switch 325: grounds 330-*a*, 330-*b*, and 330-*c*: diode element 335-*a*, capacitor 340: resistor 345, or any combination thereof (e.g., which may affect backscattering). Switch 325 may be coupled with RF element 320-*a* and may be configured to selectively couple RF element 320-*a* with ground 330-*a* or diode element 335-*a*. Diode element 335-*a* may be coupled with capacitor 340 and resistor 345, which may be in parallel. In other examples, capacitor 340 and resistor 345 may be in a different configuration (e.g., in series) or other elements may be included (e.g., resistor 345 in parallel with an inductor or in series with the inductor along with or without capacitor 340). In some examples, capacitor 340 and resistor 345 may have a capacitance and resistance, respectively, set such that the first circuit 310 is tuned (e.g., frequency response matched, impedance matched) with a bandwidth over which signal 350 is transmitted. Second circuit 360 may include a second diode element 335-*b* coupled with RF element 320-*b* and an energy harvester 365 coupled with diode element 335-*b*. Additionally, second circuit 360 may include a modulator 370 and a digital to analog converter 375. In some examples, diode element 335-*a*, energy harvester 365, and digital to analog converter 375 may be coupled with rechargeable battery 380.

In some examples, wireless device 205-*c* may transmit signal 350 to wireless device 205-*d* via RF element 315-*a*, where wireless device 205-*d* may receive signal 350 via RF element 320-*a*. In some examples, switch 325 may be configured to provide energy of received signal 350 to diode element 335-*a*. Switch 325 may be configured to selectively modify a tuning of first circuit 310, which may generate a backscattered signal 355 derived from signal 350 to wireless device 205-*c*. In one example, switch 325 may be configured to be coupled with diode element 335-*a* (e.g., wireless device 205-*d* may be configured to receive energy) or ground 330-*a* in a pattern (e.g., sequence) to indicate that an energy level of wireless device 205-*d* satisfies a predefined threshold and may be configured to suppress transmitting backscattered signal 355 in examples in which the energy level of wireless device 205-*d* does not satisfy the predefined threshold. The sequence may modulate the received signal 350 using backscattering to generate backscattered signal 355. The sequence may be based on a device identifier of the wireless device 205-*d* such that wireless device 205-*c* may recognize a response from wireless device 205-*d*. Accordingly, wireless device 205-*c*, which may not receive backscattered signal 355 in this case, may determine than an energy level of wireless device 205-*d* does not satisfy the predefined threshold and may schedule EH resources as described in FIG. 2. In some examples, switch 325, diode element 335-*a*, capacitor 340, resistor 345, and grounds 330-*b* and 330-*c* may not be present.

In some examples, wireless device 205-*c* may transmit signal 385 (via modem 308) to wireless device 205-*d* via RF element 315-*b*, where wireless device 205-*d* may receive signal 385 via RF element 320-*b*. In some examples, RF element 320-*b* may pass the signal to diode element 335-*b* and diode element 335-*b* may pass the signal to energy harvester 365, which may harvest energy for supplying energy to rechargeable battery 380, which may charge the rechargeable battery 380. Additionally, or alternatively, wireless device 205-*d* may generate a set of information bits using energy from rechargeable battery 380 and may pass the set of information bits to digital to analog converter 375. Digital to analog converter 375 may transform the set of information bits into an analog signal and may pass the analog signal to modulator 370, which may modulate the analog signal. Wireless device 205-*d* may transmit the modulated analog signal as information signal 390 via RF element 320-*c*, which wireless device 205-*c* may receive via RF element 315-*b* or another RF element of wireless device 205-*c*. In some cases, first circuit 310 and second circuit 360 may be coupled with a single RF element 320.

Figure 4:
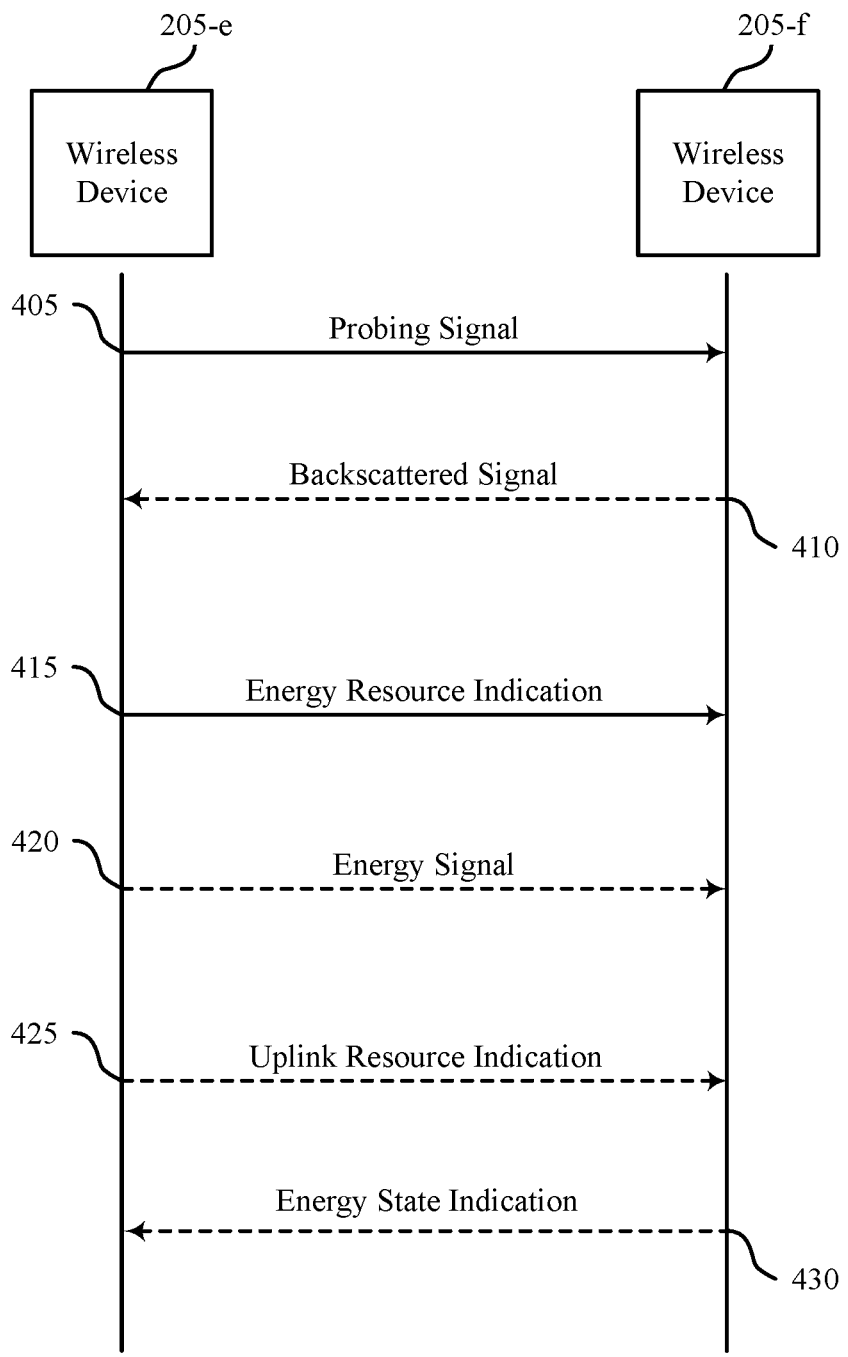
FIG. 4 illustrates an example of a process flow that supports energy-state feedback for wireless power transfer in accordance with aspects of the present disclosure.

FIG. 4 illustrates an example of a process flow 400 that supports energy-state feedback for wireless power transfer in accordance with aspects of the present disclosure. In some examples, process flow 400 may be implemented by one or more aspects of wireless communications system 200. For instance, wireless device 205-*e* may be an example of a wireless device 205-*a* as described with reference to FIG. 2 and wireless device 205-*f* may be an example of a wireless device 205-*b* as described with reference to FIG. 2. In some examples, first wireless device 205-*e* may be an example of a base station, an EN, or an HAP, and second wireless device 205-*f* may be an example of an IoT wireless device and/or a UE.

At 405, first wireless device 205-*e* may transmit, to second wireless device 205-*f*, a first signal for probing an energy state of second wireless device 205-*e*. In some examples, first wireless device 205-*e* may transmit multiple probing signals to second wireless device 205-*f*.

At 410, first wireless device 205-*e* may monitor for a second, backscattered signal indicating the energy state of second wireless device 205-*f*. In some examples, at 410, second wireless device 205-*f* may transmit the second, backscattered signal to first wireless device, where an energy for transmitting the second signal is derived from the first signal, and where the second signal indicates an energy state for first wireless device 205-*e*. In some examples, second wireless device 205-*f* may transmit the second signal based on the energy state of second wireless device 205-*f* being above a threshold level.

At 415, first wireless device 205-*e* may transmit, to second wireless device 205-*f*, an indication of resources for harvesting energy based on monitoring for the second, backscattered signal. In some examples, transmitting the indication of the resources is based on a quantity of probing signals in the multiple probing signals being above a threshold quantity and failing to detect a respective backscattered signal for each of the multiple probing signals. In some examples, transmitting the indication of resources may be based on an energy state indicated by the second signal being below a threshold level. In some examples, transmitting the indication of resources for harvesting energy may be based on a traffic profile for a network associated with the first wireless device and the second wireless device. In some examples, the first signal is received over a first frequency band and the indication of resources for harvesting energy is received over a second frequency band that excludes the first frequency band. For instance, the first signal may be out of band with the cell (e.g., a carrier for the cell) used for communicating the indication of resources. In other examples, the first signal is received over a same frequency band as the indication of resources for harvesting energy. For instance, the first signal may be in-band with the cell used for communicating the indication of resources.

In some examples, first wireless device 205-*e* may transmit the indication of resources for harvesting energy based on a type of traffic associated with second wireless device 205-*f*. In some examples, first wireless device 205-*e* may transmit a second indication of resources for harvesting energy based on channel feedback associated with second wireless device 205-*f*, one or more scheduled transmissions from first wireless device 205-*e*, or both.

At 420, first wireless device 205-*e* may transmit, to second wireless device 205-*f*, a third signal distinct from the first signal and associated with harvesting energy. In some examples, the first signal may be transmitted over a first frequency band and the third signal may be transmitted over a second frequency band that excludes the first frequency band. For instance, the first signal may be out-of-band with the cell used for communicating the third signal. In other examples, the first signal may be transmitted over a same frequency band as the third signal. For instance, the first signal may be in-band with the cell used for communicating the third signal.

At 425, first wireless device 205-*e* may transmit, to second wireless device 205-*f*, a first message scheduling an uplink resource. For instance, first wireless device 205-*e* may transmit a physical downlink control channel (PDCCH) transmission to second wireless device 205-*f* that includes the first message scheduling the uplink resource. In some examples, the first signal may be out-of-band of the cell used for communicating the first message. Alternatively, the first signal may be in-band with the cell used for communicating the first message.

At 430, second wireless device 205-*f* may transmit, to first wireless device 205-*e*, a second message over the uplink resource and indicating a second energy state of second wireless device 205-*f*. For instance, second wireless device 205-*f* may transmit a physical uplink shared channel (PUSCH) transmission to second wireless device 205-*e* that the includes the second message indicating the second energy state of second wireless device 205-*f*. In some examples, the first signal may be out-of-band with the cell used for communicating the second message. Alternatively, the first signal may be in-band with the cell used for communicating the second message.

Figure 5:
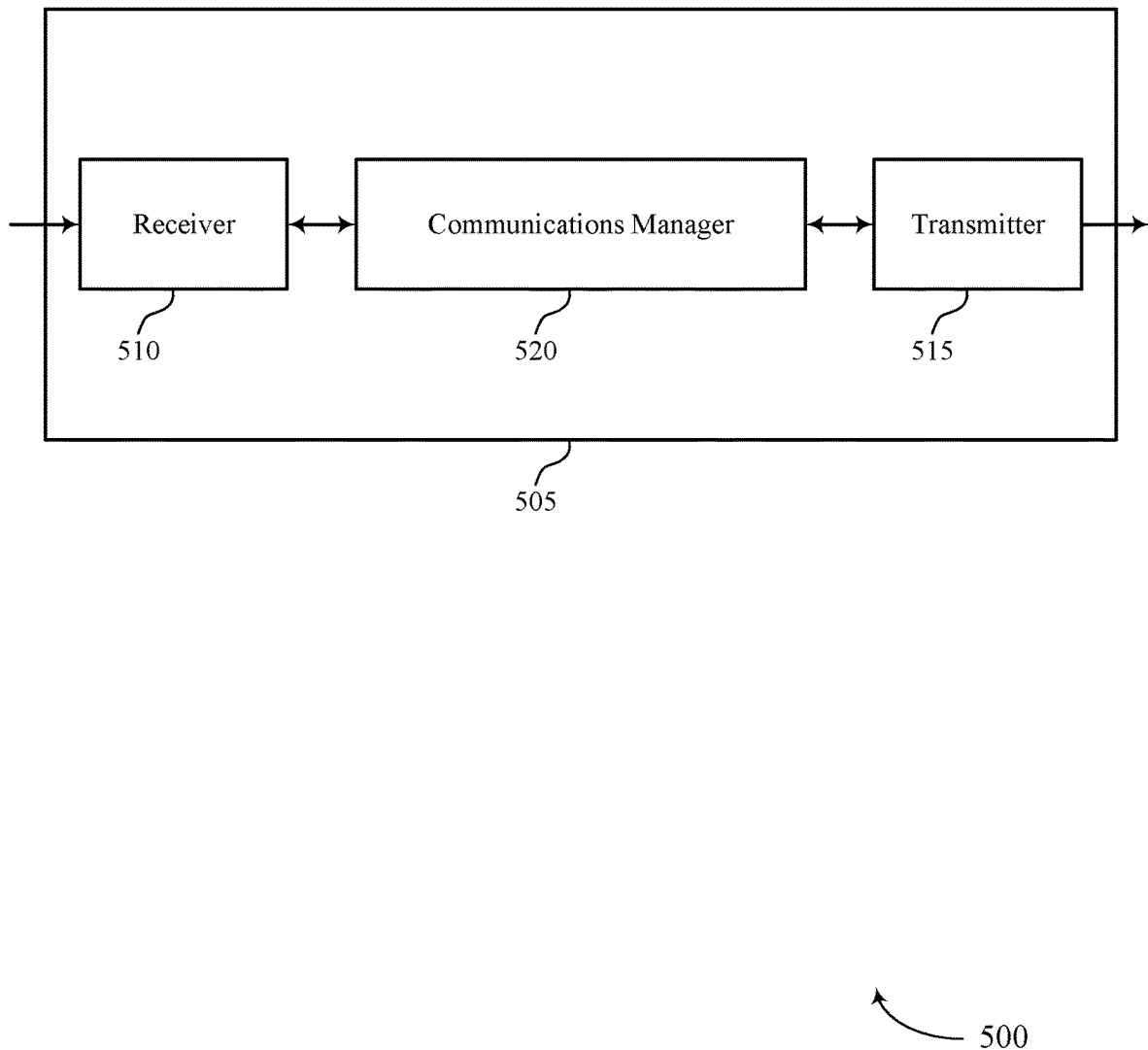
FIGS. 5 and 6 show block diagrams of devices that support energy-state feedback for wireless power transfer in accordance with aspects of the present disclosure.

FIG. 5 shows a block diagram 500 of a device 505 that supports energy-state feedback for wireless power transfer in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to energy-state feedback for wireless power transfer). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to energy-state feedback for wireless power transfer). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of energy-state feedback for wireless power transfer as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. For example, the communications manager 520 may be configured as or otherwise support a means for receiving, from a second wireless device, a first signal. The communications manager 520 may be configured as or otherwise support a means for transmitting, based on receiving the first signal, a second signal to the second wireless device, where an energy for transmitting the second signal is derived from the first signal, and where the second signal indicates an energy state of the first wireless device. The communications manager 520 may be configured as or otherwise support a means for receiving, from the second wireless device, an indication of resources for harvesting energy based on transmitting the second signal that indicates the energy state of the first wireless device.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for device 505 to receive a reduced number of indications of resources for harvesting energy and/or a reduced number of signals on those resources from a base station, EN, or AP. Accordingly, additional resources may be available for communicating information and the efficiency of wireless communications may increase.

Figure 6:
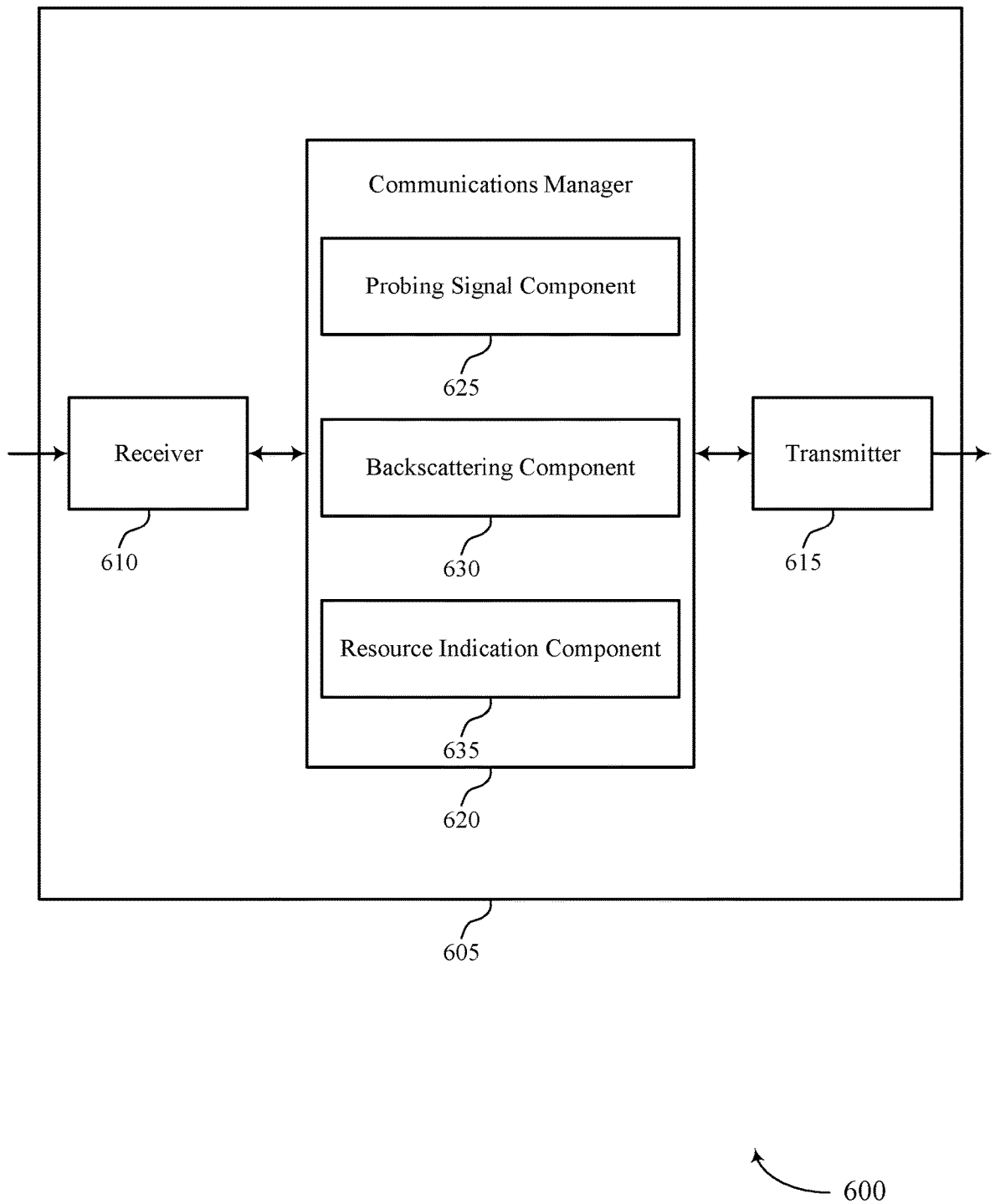

FIG. 6 shows a block diagram 600 of a device 605 that supports energy-state feedback for wireless power transfer in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to energy-state feedback for wireless power transfer). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to energy-state feedback for wireless power transfer). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of energy-state feedback for wireless power transfer as described herein. For example, the communications manager 620 may include a probing signal component 625, a backscattering component 630, a resource indication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. The probing signal component 625 may be configured as or otherwise support a means for receiving, from a second wireless device, a first signal. The backscattering component 630 may be configured as or otherwise support a means for transmitting, based on receiving the first signal, a second signal to the second wireless device, where an energy for transmitting the second signal is derived from the first signal, and where the second signal indicates an energy state of the first wireless device. The resource indication component 635 may be configured as or otherwise support a means for receiving, from the second wireless device, an indication of resources for harvesting energy based on transmitting the second signal that indicates the energy state of the first wireless device.

Figure 7:
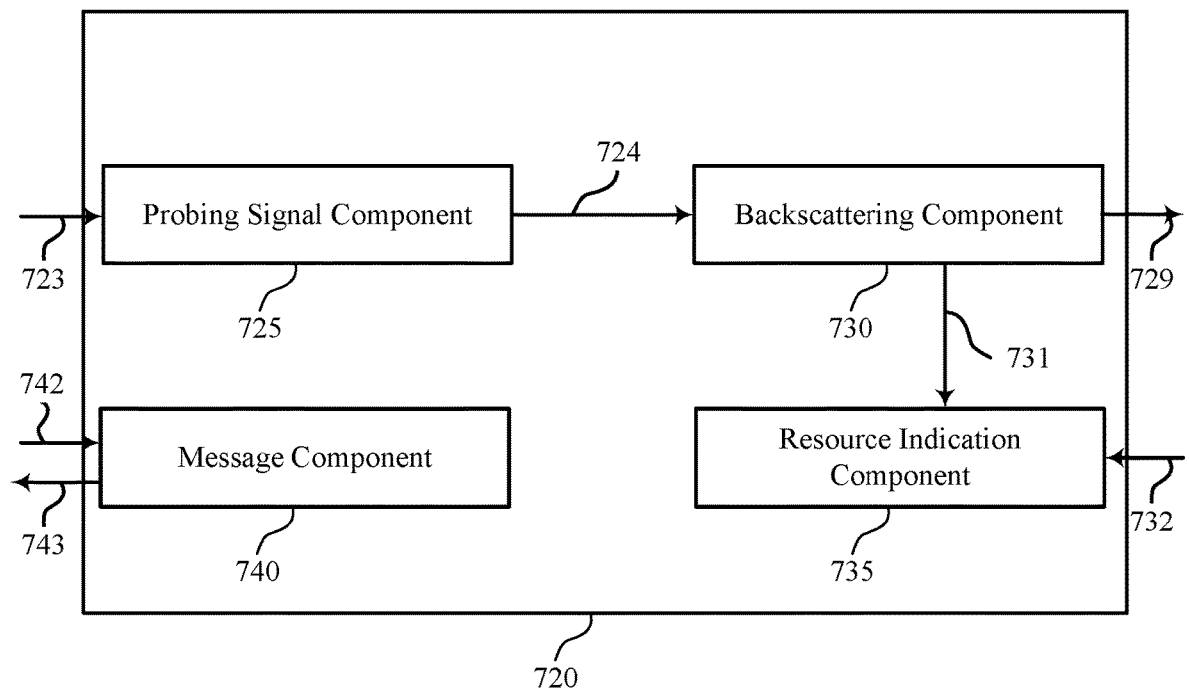
FIG. 7 shows a block diagram of a communications manager that supports energy-state feedback for wireless power transfer in accordance with aspects of the present disclosure.

FIG. 7 shows a block diagram 700 of a communications manager 720 that supports energy-state feedback for wireless power transfer in accordance with aspects of the present disclosure. The communications manager 720 may be an example of aspects of a communications manager 520, a communications manager 620, or both, as described herein. The communications manager 720, or various components thereof, may be an example of means for performing various aspects of energy-state feedback for wireless power transfer as described herein. For example, the communications manager 720 may include a probing signal component 725, a backscattering component 730, a resource indication component 735, a message component 740, or any combination thereof. Each of these components may communicate, directly or indirectly, with one another (e.g., via one or more buses).

The communications manager 720 may support wireless communication at a first wireless device in accordance with examples as disclosed herein. The probing signal component 725 may be configured as or otherwise support a means for receiving, from a second wireless device, a first signal. For instance, the probing signal component 725 may receive the first signal 723. The backscattering component 730 may be configured as or otherwise support a means for transmitting, based on receiving the first signal, a second signal to the second wireless device, where an energy for transmitting the second signal is derived from the first signal, and where the second signal indicates an energy state of the first wireless device. For instance, backscattering component 730 may transmit a second signal 729. In some examples, backscattering component may transmit an indication 724 of the first signal to backscattering component 730. The resource indication component 735 may be configured as or otherwise support a means for receiving, from the second wireless device, an indication of resources for harvesting energy based on transmitting the second signal that indicates the energy state of the first wireless device. For instance, resource indication component 735 may receive an indication 732 of resources for harvesting energy. In some examples, backscattering component 730 may transmit an indication 731 of the second signal to resource indication component 735.

In some examples, the backscattering component 730 may be configured as or otherwise support a means for transmitting the second signal based on the energy state being above a threshold level.

In some examples, the first signal is received over a first frequency band and the indication of resources for harvesting energy is received over a second frequency band that excludes the first frequency band.

In some examples, the first signal is received over a same frequency band as the indication of resources for harvesting energy.

In some examples, the message component 740 may be configured as or otherwise support a means for receiving, from the second wireless device, a first message 742 scheduling an uplink resource. In some examples, the message component 740 may be configured as or otherwise support a means for transmitting, to the second wireless device, a second message 743 over the uplink resource and indicating a second energy state of the first wireless device.

In some examples, the first wireless device includes an Internet of Things (IoT) wireless device and the second wireless device includes a base station.

In some examples, the first wireless device includes a UE.

Figure 8:
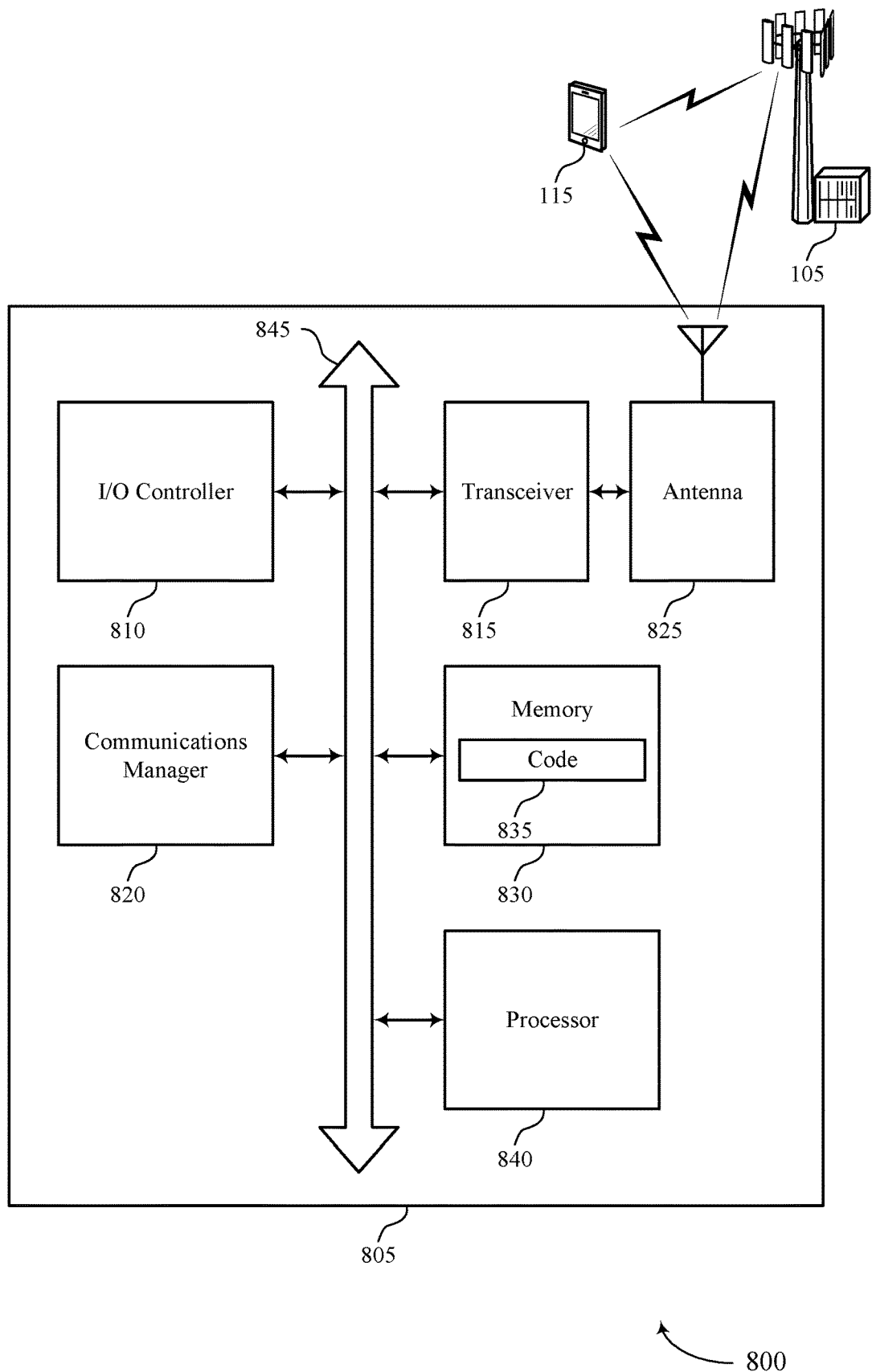
FIG. 8 shows a diagram of a system including a device that supports energy-state feedback for wireless power transfer in accordance with aspects of the present disclosure.

FIG. 8 shows a diagram of a system 800 including a device 805 that supports energy-state feedback for wireless power transfer in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2R, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting energy-state feedback for wireless power transfer). For example, the device 805 or a component of the device 805 may include a processor 840 and memory 830 coupled with or to the processor 840, the processor 840 and memory 830 configured to perform various functions described herein.

The communications manager 820 may support wireless communication at a first wireless device in accordance with examples as disclosed herein. For example, the communications manager 820 may be configured as or otherwise support a means for receiving, from a second wireless device, a first signal. The communications manager 820 may be configured as or otherwise support a means for transmitting, based on receiving the first signal, a second signal to the second wireless device, where an energy for transmitting the second signal is derived from the first signal, and where the second signal indicates an energy state of the first wireless device. The communications manager 820 may be configured as or otherwise support a means for receiving, from the second wireless device, an indication of resources for harvesting energy based on transmitting the second signal that indicates the energy state of the first wireless device.

By including or configuring the communications manager 820 in accordance with examples as described herein, the device 805 may support techniques for device 805 to receive a reduced number of indications of resources for harvesting energy and/or a reduced number of signals on those resources from a base station, EN, or AP. Accordingly, additional resources may be available for communicating information and the efficiency of wireless communications may increase.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of energy-state feedback for wireless power transfer as described herein, or the processor 840 and the memory 830 may be otherwise configured to perform or support such operations.

Figure 9:
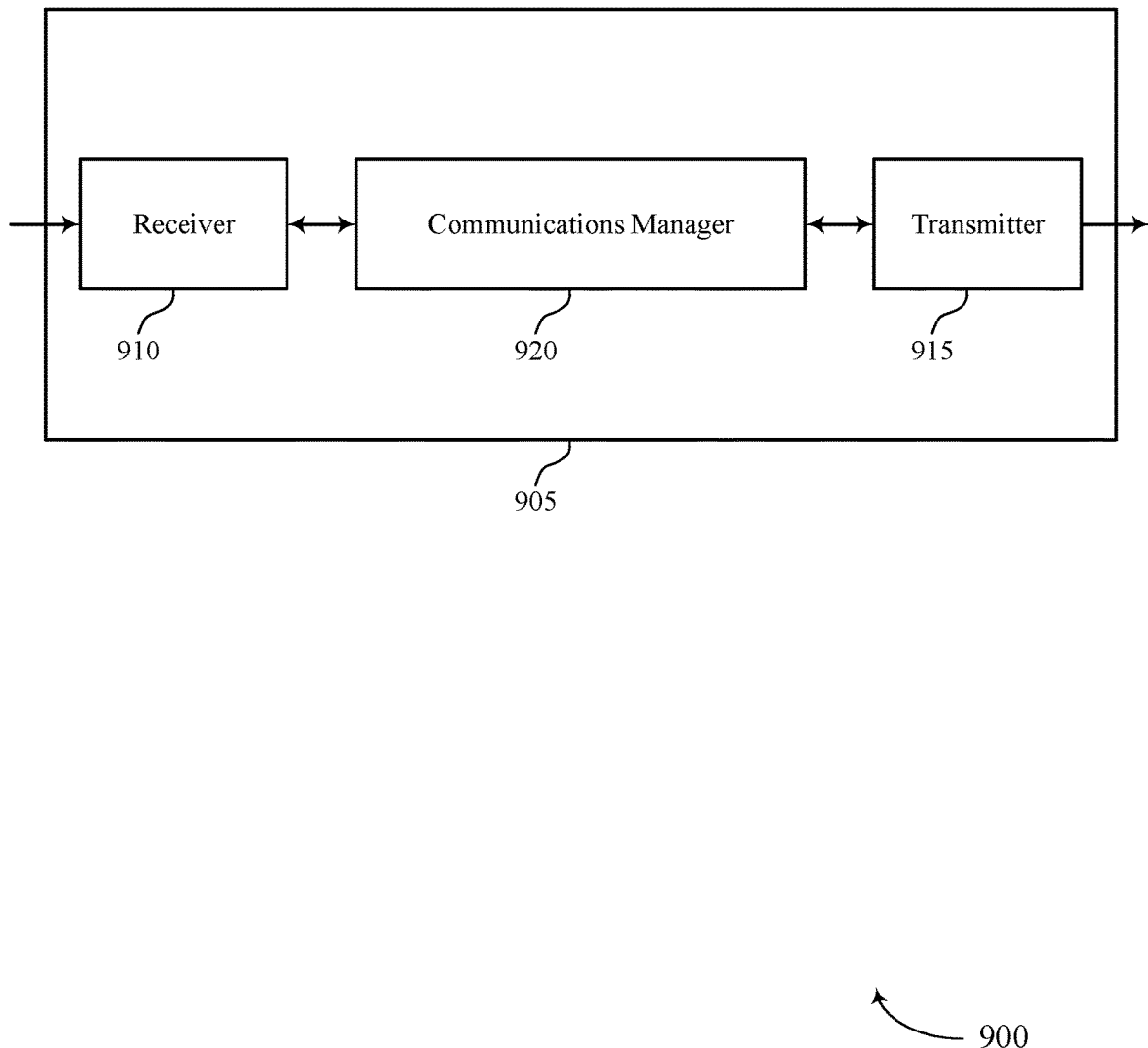
FIGS. 9 and 10 show block diagrams of devices that support energy-state feedback for wireless power transfer in accordance with aspects of the present disclosure.

FIG. 9 shows a block diagram 900 of a device 905 that supports energy-state feedback for wireless power transfer in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to energy-state feedback for wireless power transfer). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to energy-state feedback for wireless power transfer). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of energy-state feedback for wireless power transfer as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first wireless device in accordance with examples as disclosed herein. For example, the communications manager 920 may be configured as or otherwise support a means for transmitting, to a second wireless device, a first signal for probing an energy state of the second wireless device. The communications manager 920 may be configured as or otherwise support a means for monitoring for a second, backscattered signal indicating the energy state of the second wireless device. The communications manager 920 may be configured as or otherwise support a means for transmitting, to the second wireless device, an indication of resources for harvesting energy based on monitoring for the second, backscattered signal. The communications manager 920 may be configured as or otherwise support a means for transmitting, to the second wireless device and over the resources, a third signal distinct from the first signal and associated with harvesting energy.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for the device 905 to transmit a reduced number of indications of resources for harvesting energy and/or a reduced number of signals on those resources to an IoT device or a UE. Accordingly, additional resources may be available for communicating information and the efficiency of wireless communications may increase.

Figure 10:
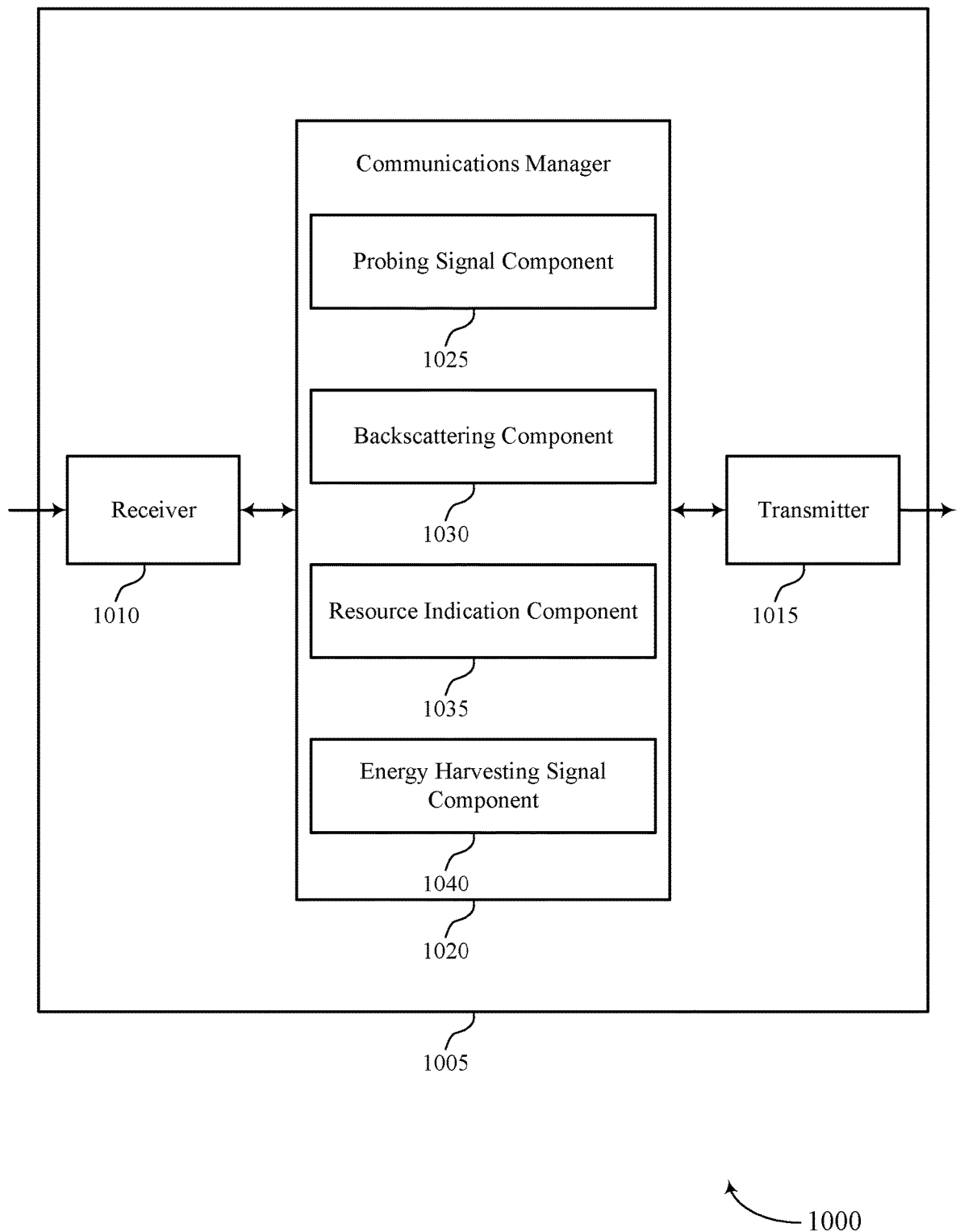

FIG. 10 shows a block diagram 1000 of a device 1005 that supports energy-state feedback for wireless power transfer in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to energy-state feedback for wireless power transfer). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to energy-state feedback for wireless power transfer). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of energy-state feedback for wireless power transfer as described herein. For example, the communications manager 1020 may include a probing signal component 1025, a backscattering component 1030, a resource indication component 1035, an energy harvesting signal component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first wireless device in accordance with examples as disclosed herein. The probing signal component 1025 may be configured as or otherwise support a means for transmitting, to a second wireless device, a first signal for probing an energy state of the second wireless device. The backscattering component 1030 may be configured as or otherwise support a means for monitoring for a second, backscattered signal indicating the energy state of the second wireless device. The resource indication component 1035 may be configured as or otherwise support a means for transmitting, to the second wireless device, an indication of resources for harvesting energy based on monitoring for the second, backscattered signal. The energy harvesting signal component 1040 may be configured as or otherwise support a means for transmitting, to the second wireless device and over the resources, a third signal distinct from the first signal and associated with harvesting energy.

Figure 11:
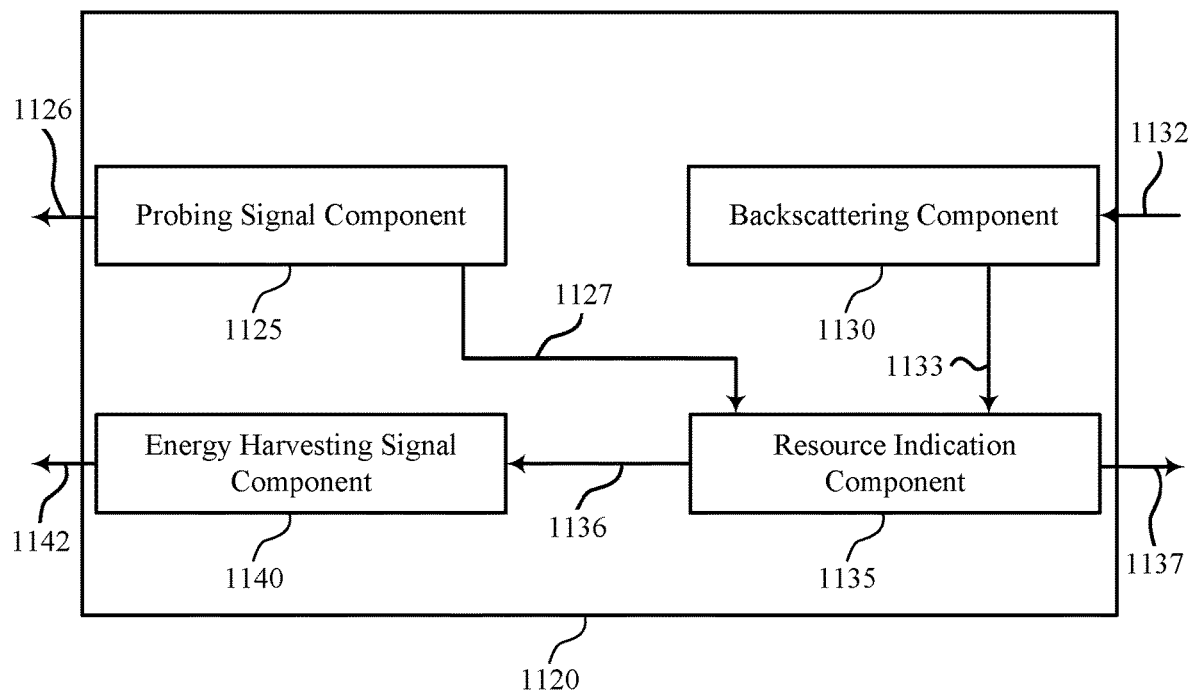
FIG. 11 shows a block diagram of a communications manager that supports energy-state feedback for wireless power transfer in accordance with aspects of the present disclosure.

FIG. 11 shows a block diagram 1100 of a communications manager 1120 that supports energy-state feedback for wireless power transfer in accordance with aspects of the present disclosure. The communications manager 1120 may be an example of aspects of a communications manager 920, a communications manager 1020, or both, as described herein. The communications manager 1120, or various components thereof, may be an example of means for performing various aspects of energy-state feedback for wireless power transfer as described herein. For example, the communications manager 1120 may include a probing signal component 1125, a backscattering component 1130, a resource indication component 1135, an energy harvesting signal component 1140, or any combination thereof. Each of these components may communicate, directly or indirectly, with one another (e.g., via one or more buses).

The communications manager 1120 may support wireless communication at a first wireless device in accordance with examples as disclosed herein. The probing signal component 1125 may be configured as or otherwise support a means for transmitting, to a second wireless device, a first signal for probing an energy state of the second wireless device. For instance, probing signal component 1125 may transmit a first signal 1126. The backscattering component 1130 may be configured as or otherwise support a means for monitoring for a second, backscattered signal indicating the energy state of the second wireless device. In some examples, backscattering component 1130 may receive the second, backscattered signal 1132. The resource indication component 1135 may be configured as or otherwise support a means for transmitting, to the second wireless device, an indication of resources for harvesting energy based on monitoring for the second, backscattered signal. For instance, the resource indication component 1135 may transmit an indication 1137 of resources for harvesting energy. In some examples, backscattering component 1130 may transmit an indication 1133 of the second signal to resource indication component 1135. The energy harvesting signal component 1140 may be configured as or otherwise support a means for transmitting, to the second wireless device and over the resources, a third signal distinct from the first signal and associated with harvesting energy. For instance, energy harvesting signal component 1140 may transmit a third signal 1142. In some examples, resource indication component 1135 may transmit an indication 1136 of the resources for harvesting energy to energy harvesting signal component 1140.

In some examples, the probing signal component 1125 may be configured as or otherwise support a means for transmitting a set of multiple probing signals to the second wireless device, where transmitting the indication of the resources for harvesting energy is based on a quantity of probing signals in the plurality being above a threshold quantity and failing to detect a respective backscattered signal for each of the set of multiple probing signals. In some examples, the probing signal component 1125 may transmit, to resource indication component 1135, an indication 1127 of the quantity of probing signals in the plurality being above the threshold and/or the failing to detect the respective backscattered signal for each of the set of multiple probing signals.

In some examples, the resource indication component 1135 may be configured as or otherwise support a means for transmitting the indication of resources for harvesting energy based on an energy state indicated by the second signal being below a threshold level.

In some examples, the resource indication component 1135 may be configured as or otherwise support a means for transmitting the indication of resources for harvesting energy based on a traffic profile for a network associated with the first wireless device and the second wireless device.

In some examples, the resource indication component 1135 may be configured as or otherwise support a means for transmitting the indication of harvesting energy based on a type of traffic associated with the second wireless device.

In some examples, the resource indication component 1135 may be configured as or otherwise support a means for transmitting a second indication of resources for harvesting energy based on channel feedback associated with the second wireless device, one or more scheduled transmissions from the first wireless device, or both.

In some examples, the first signal is transmitted over a first frequency band and the third signal is transmitted over a second frequency band that excludes the first frequency band.

In some examples, the first signal is transmitted over a same frequency band as the third signal.

In some examples, the first wireless device includes a base station and the second wireless device includes an Internet of Things (IoT) wireless device.

In some examples, the second wireless device includes a UE.

Figure 12:
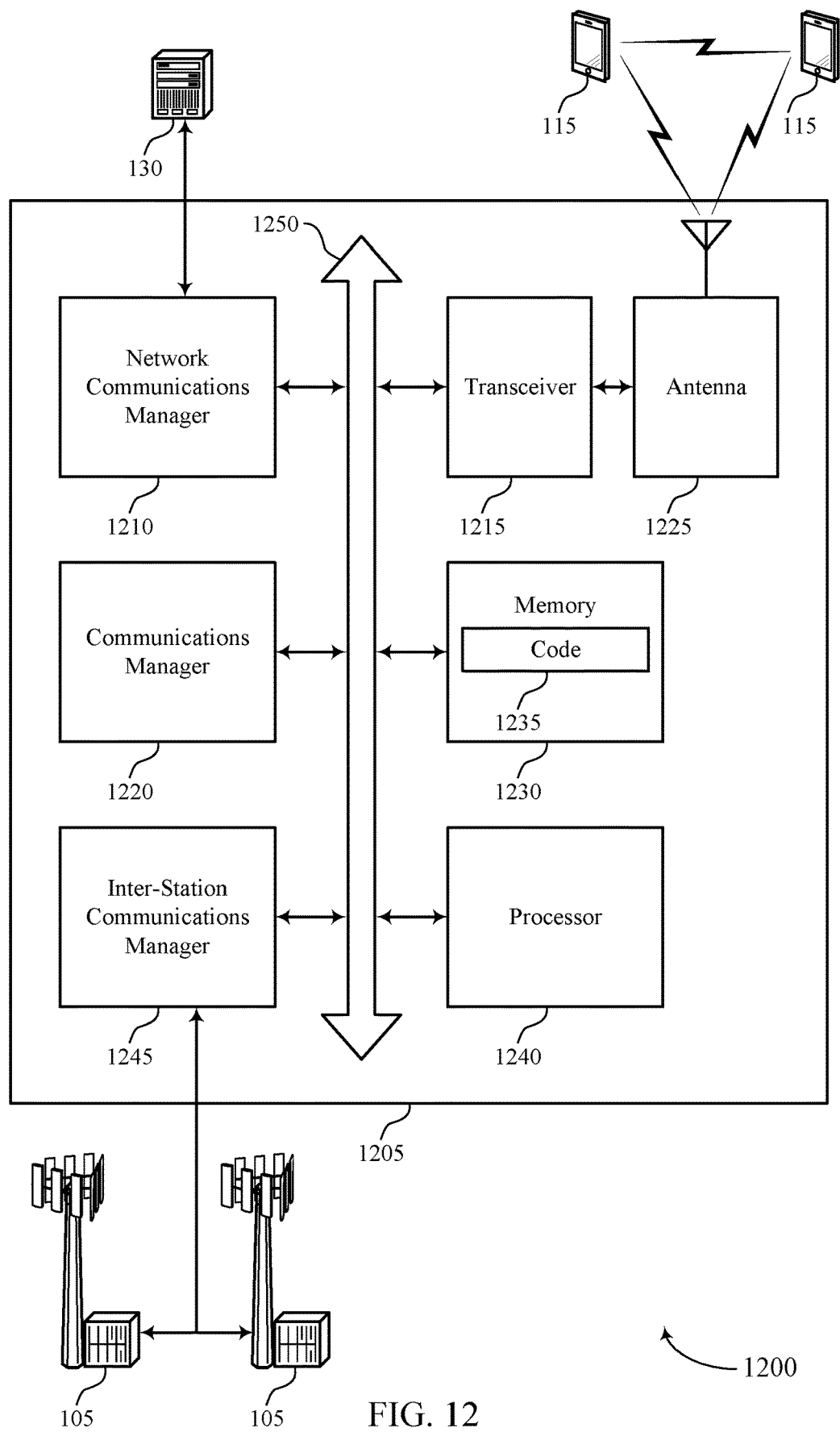
FIG. 12 shows a diagram of a system including a device that supports energy-state feedback for wireless power transfer in accordance with aspects of the present disclosure.

FIG. 12 shows a diagram of a system 1200 including a device 1205 that supports energy-state feedback for wireless power transfer in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting energy-state feedback for wireless power transfer). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a first wireless device in accordance with examples as disclosed herein. For example, the communications manager 1220 may be configured as or otherwise support a means for transmitting, to a second wireless device, a first signal for probing an energy state of the second wireless device. The communications manager 1220 may be configured as or otherwise support a means for monitoring for a second, backscattered signal indicating the energy state of the second wireless device. The communications manager 1220 may be configured as or otherwise support a means for transmitting, to the second wireless device, an indication of resources for harvesting energy based on monitoring for the second, backscattered signal. The communications manager 1220 may be configured as or otherwise support a means for transmitting, to the second wireless device and over the resources, a third signal distinct from the first signal and associated with harvesting energy.

By including or configuring the communications manager 1220 in accordance with examples as described herein, the device 1205 may support techniques for device 1205 to transmit a reduced number of indications of resources for harvesting energy and/or a reduced number of signals on those resources to an IoT device or a UE. Accordingly, additional resources may be available for communicating information and the efficiency of wireless communications may increase.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of energy-state feedback for wireless power transfer as described herein, or the processor 1240 and the memory 1230 may be otherwise configured to perform or support such operations.

Figure 13:
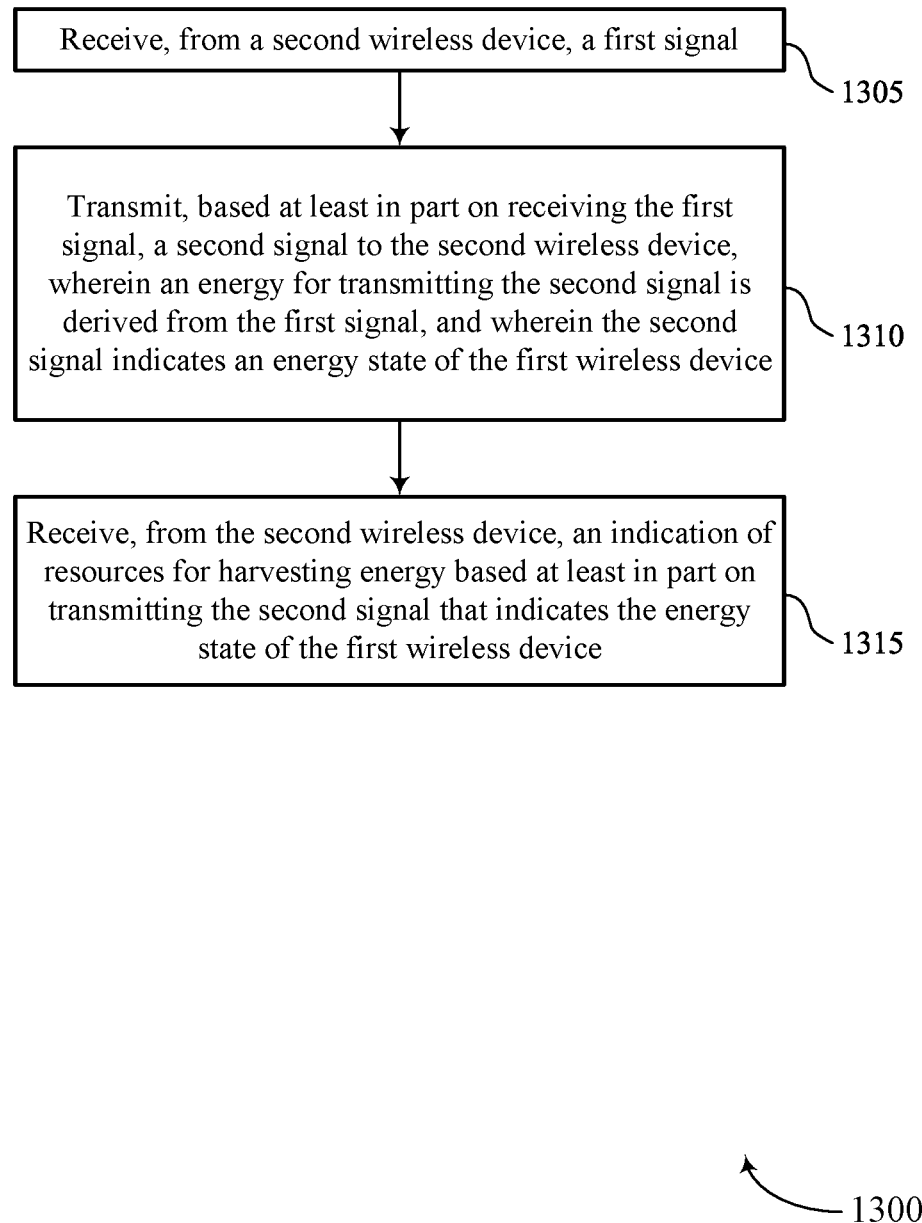
FIGS. 13 through 16 show flowcharts illustrating methods that support energy-state feedback for wireless power transfer in accordance with aspects of the present disclosure.

FIG. 13 shows a flowchart illustrating a method 1300 that supports energy-state feedback for wireless power transfer in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a second wireless device, a first signal. In some examples, receiving the first signal may include identifying time-frequency resources over which the first signal is to be received and receiving the first signal over the identified time-frequency resources. The operations of 1305 may be performed in accordance with examples as disclosed herein. In some examples, aspects of the operations of 1305 may be performed by a probing signal component 725 as described with reference to FIG. 7.

At 1310, the method may include transmitting, based on receiving the first signal, a second signal to the second wireless device, where an energy for transmitting the second signal is derived from the first signal, and where the second signal indicates an energy state of the first wireless device. In some examples, transmitting the second signal includes identifying time-frequency resources over which the second signal is to be transmitted and transmitting the second signal over the identified time-frequency resources. The operations of 1310 may be performed in accordance with examples as disclosed herein. In some examples, aspects of the operations of 1310 may be performed by a backscattering component 730 as described with reference to FIG. 7.

At 1315, the method may include receiving, from the second wireless device, an indication of resources for harvesting energy based on transmitting the second signal that indicates the energy state of the first wireless device. In some examples, receiving the indication of resources may include identifying time-frequency resources over which the indication of resources is to be received and receiving the indication of resources over the identified time-frequency resources. The operations of 1315 may be performed in accordance with examples as disclosed herein. In some examples, aspects of the operations of 1315 may be performed by a resource indication component 735 as described with reference to FIG. 7.

Figure 14:
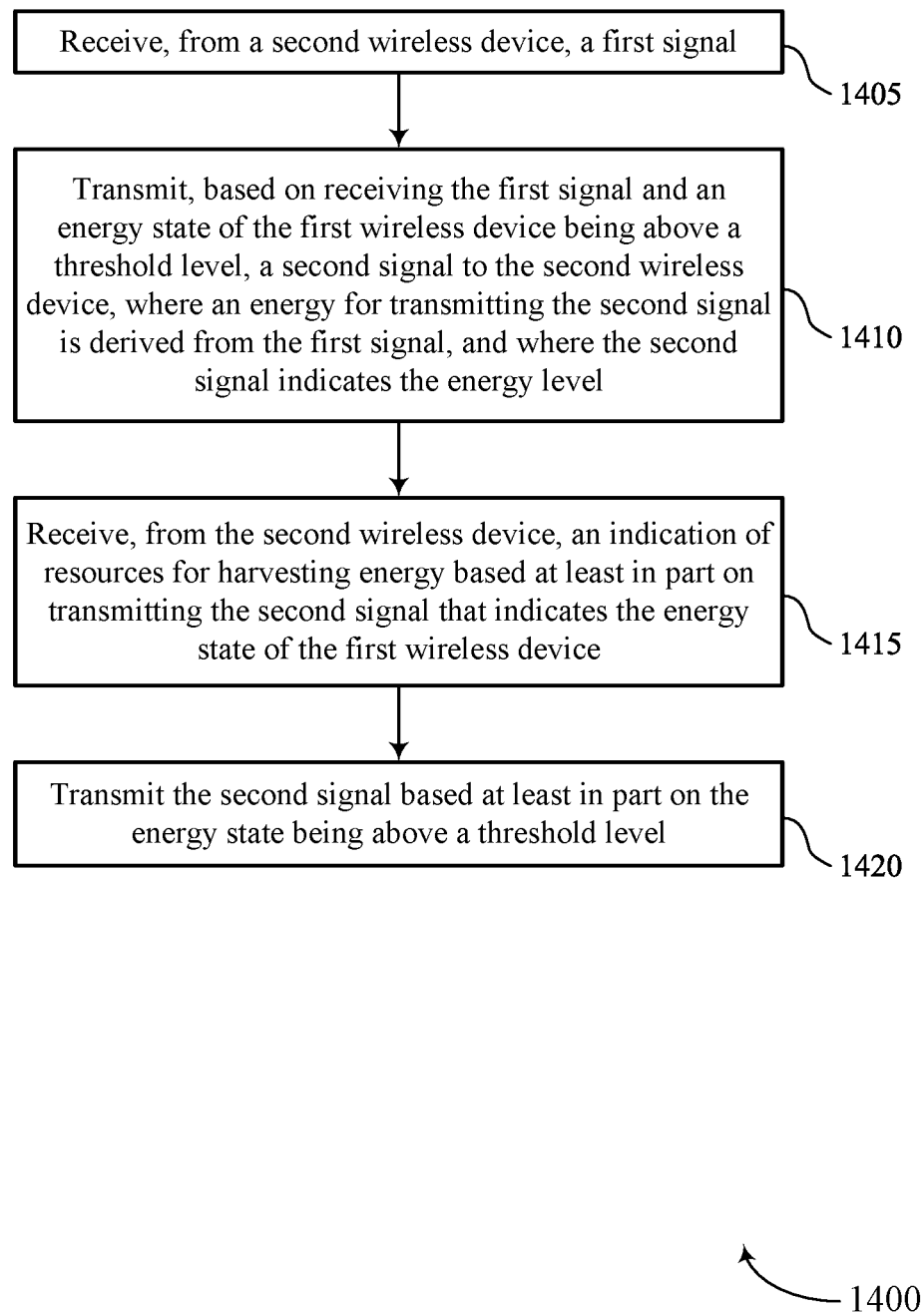

FIG. 14 shows a flowchart illustrating a method 1400 that supports energy-state feedback for wireless power transfer in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a second wireless device, a first signal. In some examples, receiving the first signal may include identifying time-frequency resources over which the first signal is to be received and receiving the first signal over the identified time-frequency resources. The operations of 1405 may be performed in accordance with examples as disclosed herein. In some examples, aspects of the operations of 1405 may be performed by a probing signal component 725 as described with reference to FIG. 7.

At 1410, the method may include transmitting, based on receiving the first signal and an energy state of the first wireless device being above a threshold level, a second signal to the second wireless device, where an energy for transmitting the second signal is derived from the first signal, and where the second signal indicates the energy level. In some examples, transmitting the second signal includes identifying time-frequency resources over which the second signal is to be transmitted and transmitting the second signal over the identified time-frequency resources. The operations of 1410 may be performed in accordance with examples as disclosed herein. In some examples, aspects of the operations of 1410 may be performed by a backscattering component 730 as described with reference to FIG. 7.

At 1415, the method may include receiving, from the second wireless device, an indication of resources for harvesting energy based on transmitting the second signal that indicates the energy state of the first wireless device. In some examples, receiving the indication of resources may include identifying time-frequency resources over which the indication of resources is to be received and receiving the indication of resources over the identified time-frequency resources. The operations of 1415 may be performed in accordance with examples as disclosed herein. In some examples, aspects of the operations of 1415 may be performed by a resource indication component 735 as described with reference to FIG. 7.

Figure 15:
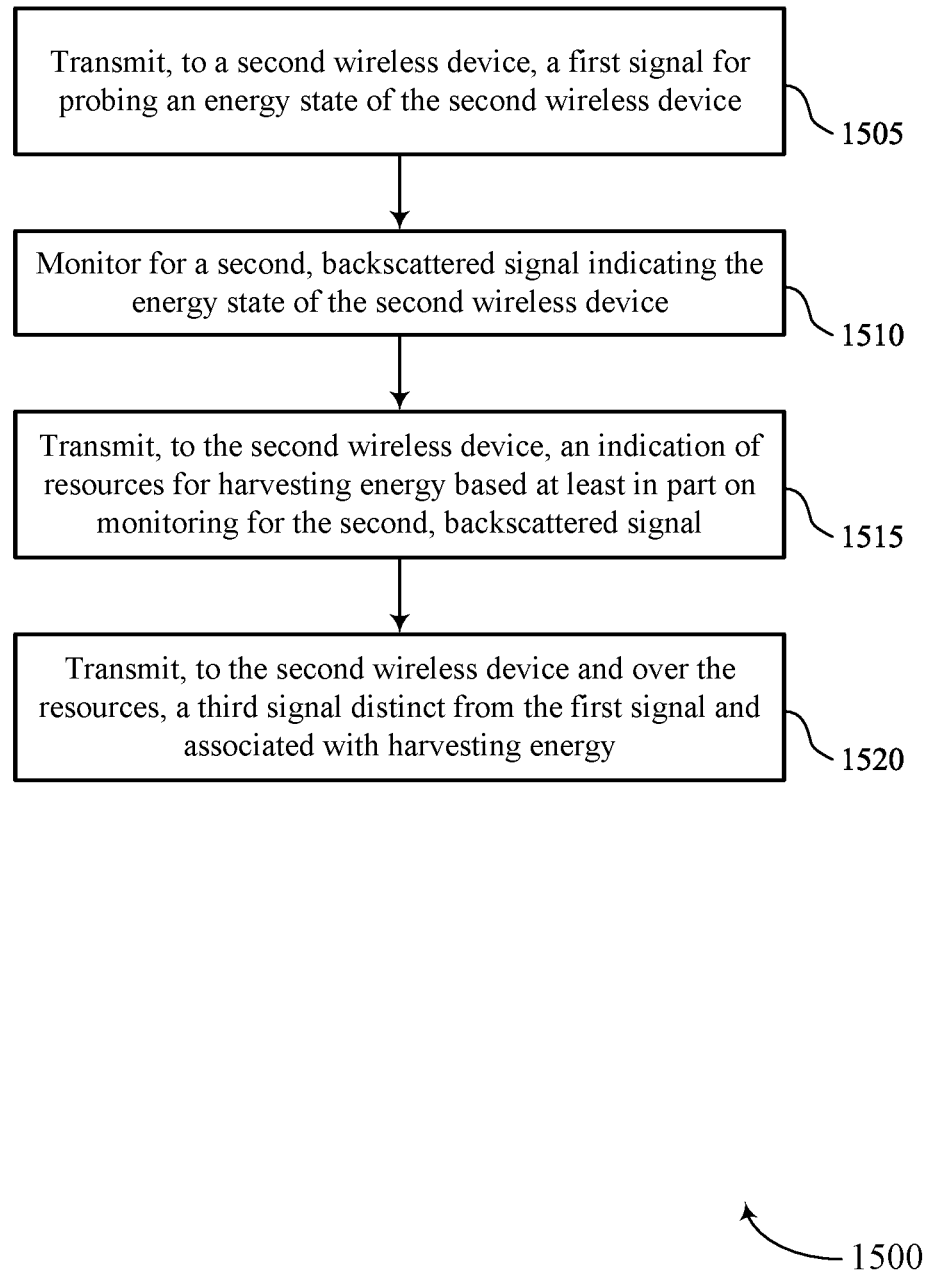

FIG. 15 shows a flowchart illustrating a method 1500 that supports energy-state feedback for wireless power transfer in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1505, the method may include transmitting, to a second wireless device, a first signal for probing an energy state of the second wireless device. In some examples, transmitting the first signal includes identifying time-frequency resources over which the first signal is to be transmitted and transmitting the first signal over the identified time-frequency resources. The operations of 1505 may be performed in accordance with examples as disclosed herein. In some examples, aspects of the operations of 1505 may be performed by a probing signal component 1125 as described with reference to FIG. 11.

At 1510, the method may include monitoring for a second, backscattered signal indicating the energy state of the second wireless device. In some examples, monitoring for the second signal may include identifying a duration for which to monitor for the second signal and monitoring for backscattered signal during identified duration. The operations of 1510 may be performed in accordance with examples as disclosed herein. In some examples, aspects of the operations of 1510 may be performed by a backscattering component 1130 as described with reference to FIG. 11.

At 1515, the method may include transmitting, to the second wireless device, an indication of resources for harvesting energy based on monitoring for the second, backscattered signal. In some examples, transmitting the indication of resources includes identifying time-frequency resources over which the indication of resources is to be transmitted and transmitting the indication of resources over the identified time-frequency resources. The operations of 1515 may be performed in accordance with examples as disclosed herein. In some examples, aspects of the operations of 1515 may be performed by a resource indication component 1135 as described with reference to FIG. 11.

At 1520, the method may include transmitting, to the second wireless device and over the resources, a third signal distinct from the first signal and associated with harvesting energy. In some examples, transmitting the third signal includes identifying time-frequency resources over which the third signal is to be transmitted and transmitting the third signal over the identified time-frequency resources. The operations of 1520 may be performed in accordance with examples as disclosed herein. In some examples, aspects of the operations of 1520 may be performed by an energy harvesting signal component 1140 as described with reference to FIG. 11.

Figure 16:
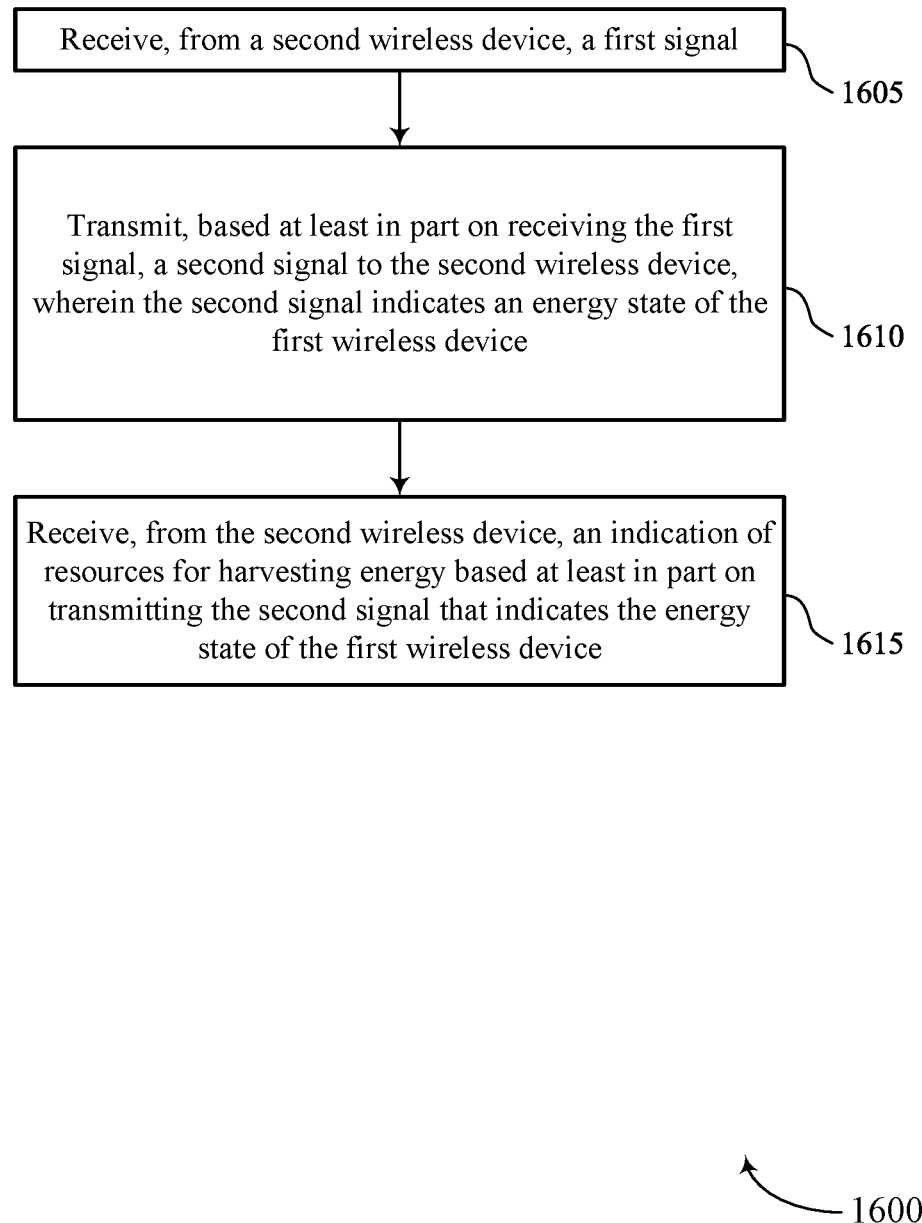

FIG. 16 shows a flowchart illustrating a method 1600 that supports energy-state feedback for wireless power transfer in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving, from a second wireless device, a first signal. In some examples, receiving the first signal may include identifying time-frequency resources over which the first signal is to be received and receiving the first signal over the identified time-frequency resources. The operations of 1605 may be performed in accordance with examples as disclosed herein. In some examples, aspects of the operations of 1605 may be performed by a probing signal component 725 as described with reference to FIG. 7.

At 1610, the method may include transmitting, based on receiving the first signal, a second signal to the second wireless device, where the second signal indicates an energy state of the first wireless device. In some examples, transmitting the second signal includes identifying time-frequency resources over which the second signal is to be transmitted and transmitting the second signal over the identified time-frequency resources. The operations of 1610 may be performed in accordance with examples as disclosed herein. In some examples, aspects of the operations of 1610 may be performed by a backscattering component 730 as described with reference to FIG. 7.

At 1615, the method may include receiving, from the second wireless device, an indication of resources for harvesting energy based on transmitting the second signal that indicates the energy state of the first wireless device. In some examples, receiving the indication of resources may include identifying time-frequency resources over which the indication of resources is to be received and receiving the indication of resources over the identified time-frequency resources. The operations of 1615 may be performed in accordance with examples as disclosed herein. In some examples, aspects of the operations of 1615 may be performed by a resource indication component 735 as described with reference to FIG. 7.

The following provides an overview of aspects of the present disclosure:

Aspect 1: A method for wireless communication at a first wireless device, comprising: receiving, from a second wireless device, a first signal: transmitting, based at least in part on receiving the first signal, a second signal to the second wireless device, wherein an energy for transmitting the second signal is derived from the first signal, and wherein the second signal indicates an energy state of the first wireless device; and receiving, from the second wireless device, an indication of resources for harvesting energy based at least in part on transmitting the second signal that indicates the energy state of the first wireless device.

Aspect 2: The method of aspect 1, further comprising: transmitting the second signal based at least in part on the energy state being above a threshold level.

Aspect 3: The method of any of aspects 1 through 2, wherein the first signal is received over a first frequency band and the indication of resources for harvesting energy is received over a second frequency band that excludes the first frequency band.

Aspect 4: The method of any of aspects 1 through 3, wherein the first signal is received over a same frequency band as the indication of resources for harvesting energy.

Aspect 5: The method of any of aspects 1 through 4, further comprising: receiving, from the second wireless device, a first message scheduling an uplink resource; and transmitting, to the second wireless device, a second message over the uplink resource and indicating a second energy state of the first wireless device.

Aspect 6: The method of any of aspects 1 through 5, wherein the first wireless device comprises an Internet of Things (IoT) wireless device and the second wireless device comprises a base station.

Aspect 7: The method of aspect 6, wherein the first wireless device comprises a UE.

Aspect 8: A method for wireless communication at a first wireless device, comprising: transmitting, to a second wireless device, a first signal for probing an energy state of the second wireless device; monitoring for a second, backscattered signal indicating the energy state of the second wireless device; transmitting, to the second wireless device, an indication of resources for harvesting energy based at least in part on monitoring for the second, backscattered signal; and transmitting, to the second wireless device and over the resources, a third signal distinct from the first signal and associated with harvesting energy.

Aspect 9: The method of aspect 8, further comprising: transmitting a plurality of probing signals to the second wireless device, wherein transmitting the indication of the resources for harvesting energy is based at least in part on a quantity of probing signals in the plurality being above a threshold quantity and failing to detect a respective backscattered signal for each of the plurality of probing signals.

Aspect 10: The method of any of aspects 8 through 9, further comprising: transmitting the indication of resources for harvesting energy based at least in part on an energy state indicated by the second signal being below a threshold level.

Aspect 11: The method of any of aspects 8 through 10, further comprising: transmitting the indication of resources for harvesting energy based at least in part on a traffic profile for a network associated with the first wireless device and the second wireless device.

Aspect 12: The method of any of aspects 8 through 11, further comprising: transmitting the indication of resources for harvesting energy based at least in part on a type of traffic associated with the second wireless device.

Aspect 13: The method of any of aspects 8 through 12, further comprising: transmitting a second indication of resources for harvesting energy based at least in part on channel feedback associated with the second wireless device, one or more scheduled transmissions from the first wireless device, or both.

Aspect 14: The method of any of aspects 8 through 13, wherein the first signal is transmitted over a first frequency band and the third signal is transmitted over a second frequency band that excludes the first frequency band.

Aspect 15: The method of any of aspects 8 through 14, wherein the first signal is transmitted over a same frequency band as the third signal.

Aspect 16: An apparatus for wireless communication at a first wireless device, comprising a processor: memory coupled with the processor; and instructions stored in the memory and executable by the processor to cause the apparatus to perform a method of any of aspects 1 through 7.

Aspect 17: An apparatus for wireless communication at a first wireless device, comprising at least one means for performing a method of any of aspects 1 through 7.

Aspect 18: A non-transitory computer-readable medium storing code for wireless communication at a first wireless device, the code comprising instructions executable by a processor to perform a method of any of aspects 1 through 7.

Aspect 19: An apparatus for wireless communication at a first wireless device, comprising a processor: memory coupled with the processor; and instructions stored in the memory and executable by the processor to cause the apparatus to perform a method of any of aspects 8 through 15.

Aspect 20: An apparatus for wireless communication at a first wireless device, comprising at least one means for performing a method of any of aspects 8 through 15.

Aspect 21: A non-transitory computer-readable medium storing code for wireless communication at a first wireless device, the code comprising instructions executable by a processor to perform a method of any of aspects 8 through 15.

Aspect 22: A first wireless device comprising: a first circuit configured to receive, from a second wireless device, a first signal and to transmit, based at least in part on receiving the first signal, a second signal to the second wireless device, wherein an energy for transmitting the second signal is derived from the first signal, and wherein the second signal indicates an energy state of the first wireless device; and a second circuit configured to receive, from the second wireless device, an indication of resources for harvesting energy based at least in part on the first circuit transmitting the second signal that indicates the energy state of the first wireless device.

Aspect 23: The first wireless device of aspect 22, wherein the first circuit is configured to transmit the second signal based at least in part on the energy state being above a threshold level.

Aspect 24: The first wireless device of aspects 22 or 23, wherein the first circuit is configured to receive the first signal over a first frequency band and the second circuit is configured to receive the indication of resources for harvesting energy over a second frequency band that excludes the first frequency band.

Aspect 25: The first wireless device of any of aspects 22 through 24, wherein the first circuit is configured to receive the first signal over a same frequency band that the second circuit is configured to receive the indication of resources.

Aspect 26: The first wireless device of any of aspects 22 through 25, wherein the second circuit is configured to receive, from the second wireless device, a first message scheduling an uplink resource and to transmit, to the second wireless device, a second message over the uplink resource and indicating a second energy state of the first wireless device.

Aspect 27: The first wireless device of any of aspects 22 through 26, wherein the first wireless device comprises an Internet of Things (IoT) wireless device and the second wireless device comprises a base station.

Aspect 28: The first wireless device of any of aspects 22 through 27, wherein the first wireless device comprises a user equipment (UE).

Aspect 29: A first wireless device, comprising: a first circuit configured to transmit, to a second wireless device, a first signal for probing an energy state of the second wireless device and to monitor for a second, backscattered signal indicating the energy state of the second wireless device; and a second circuit configured to transmit, to the second wireless device, an indication of resources for harvesting energy based at least in part on monitoring for the second, backscattered signal and to transmit a third signal over the resources that is distinct from the first signal and associated with harvesting energy.

Aspect 30: The first wireless device of aspect 29, wherein the first circuit is configured to transmit a plurality of probing signals to the second wireless device, wherein transmitting the indication of the resources for harvesting energy is based at least in part on a quantity of probing signals in the plurality being above a threshold quantity and failing to detect a respective backscattered signal for each of the plurality of probing signals.

Aspect 31: The first wireless device of aspects 29 or 30, wherein the second circuit is configured to transmit the indication of resources for harvesting energy based at least in part on an energy state indicated by the second signal being below a threshold level.

Aspect 32: The first wireless device of any of aspects 29 through 31, wherein the second circuit is configured to transmit the indication of resources for harvesting energy based at least in part on a traffic profile associated with communication between the first wireless device and the second wireless device.

Aspect 33: The first wireless device of any of aspects 29 through 32, wherein the second circuit is configured to transmit the indication of resources for harvesting energy based at least in part on a type of traffic associated with the second wireless device.

Aspect 34: The first wireless device of any of aspects 29 through 33, wherein the second circuit is configured to transmit a second indication of resources for harvesting energy based at least in part on channel feedback associated with the second wireless device, one or more scheduled transmissions from the first wireless device, or both.

Aspect 35: The first wireless device of any of aspects 29 through 34, wherein the first circuit is configured to transmit the first signal over a first frequency band and the second circuit is configured to transmit the third signal over a second frequency band that excludes the first frequency band.

Aspect 36: The first wireless device of any of aspects 29 through 35, wherein the first circuit is configured to transmit the first signal over a same frequency band that the second circuit is configured to transmit the third signal.

It should be noted that the methods described herein describe possible implementations, and that the operations and the steps may be rearranged or otherwise modified and that other implementations are possible. Further, aspects from two or more of the methods may be combined.

A first wireless device is described. In some examples, the first wireless device may include a first circuit configured to receive, from a second wireless device, a first signal and to transmit, based on receiving the first signal, a second signal to the second wireless device, where an energy for transmitting the second signal is derived from the first signal, and where the second signal indicates an energy state of the first wireless device. The first wireless device may also include a second circuit configured to receive, from the second wireless device, an indication of resources for harvesting energy based at least in part on the first circuit transmitting the second signal that indicates the energy state of the first wireless device.

In some examples, the first wireless device may be configured to transmit the second signal based at least in part on the energy state being above a threshold level. In some examples, the first circuit may be configured to receive the first signal over a first frequency band the second circuit may be configured to receive the indication of resources for harvesting energy over a second frequency band that excludes the first frequency band. In some examples, the first circuit may be configured to receive the first signal over a same frequency band that the second circuit is configured to receive the indication of resources. In some examples, the second circuit may be configured to receive, from the second wireless device, a first message scheduling an uplink resources and to transmit, to the second wireless device, a second message over the uplink resources and indicating a second energy state of the first wireless device. In some examples, the first wireless device may include an IoT wireless device and the second wireless device may include a base station. Additionally, or alternatively, the IoT wireless device may include a UE.

A first wireless device is described. The first wireless device may include a first circuit configured to transmit, to a second wireless device, a first signal for probing an energy state of the second wireless device and to monitor for a second, backscattered signal indicating the energy state of the second wireless device. The first wireless device may include a second circuit configured to transmit, to the second wireless device, an indication of resources for harvesting energy based at least in part on monitoring for the second, backscattered signal and to transmit a third signal over the resources that is distinct from the first signal and associated with harvesting energy.

The first circuit may be configured to transmit a plurality of probing signals to the second wireless device, where transmitting the indication of the resources for harvesting energy is based at least in part on a quantity of probing signals in the plurality being above a threshold quantity and failing to detect a respective backscattered signal for each of the plurality of probing signals. In some examples, the second circuit may be configured to transmit the indication of resources for harvesting energy based at least in part on an energy state indicated by the second signal being below a threshold level. In some examples, the second circuit may be configured to transmit the indication of resources for harvesting energy based at least in part on a traffic profile associated with communication between the first wireless device and the second wireless device. In some examples, the first circuit may be configured to transmit the first signal over a first frequency band and the second circuit is configured to transmit the third signal over a second frequency band that excludes the first frequency band. In some examples, the first circuit may be configured to transmit the first signal over a same frequency band that the second circuit is configured to transmit the third signal. In some examples, the first wireless device may include a base station and the second wireless device may include an IoT wireless device. In some examples, the second wireless device includes a UE.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device comprising:
   a first circuit configured to receive, from a second wireless device, a first signal for probing an energy state of the first wireless device and to transmit, based at least in part on receiving the first signal, a second, backscattered signal to the second wireless device, wherein the second signal indicates the energy state of the first wireless device; and
   a second circuit configured to receive, from the second wireless device, an indication of time and frequency resources for harvesting energy based at least in part on the first circuit transmitting the second signal that indicates the energy state of the first wireless device.

2. The first wireless device of claim 1, wherein the first circuit is configured to transmit the second signal based at least in part on the energy state being above a threshold level.

3. The first wireless device of claim 1, wherein the first circuit is configured to receive the first signal over a first frequency band and the second circuit is configured to receive the indication of the time and frequency resources for harvesting energy over a second frequency band that excludes the first frequency band.

4. The first wireless device of claim 1, wherein the first circuit is configured to receive the first signal over a same frequency band that the second circuit is configured to receive the indication of the time and frequency resources.

5. The first wireless device of claim 1, wherein the second circuit is configured to receive, from the second wireless device, a first message scheduling an uplink resource and to transmit, to the second wireless device, a second message over the uplink resource and indicating a second energy state of the first wireless device.

6. The first wireless device of claim 1, wherein the first wireless device comprises an Internet of Things (IoT) wireless device and the second wireless device comprises a base station.

7. The first wireless device of claim 1 wherein the first wireless device comprises a user equipment (UE).

8. A first wireless device, comprising:
   a first circuit configured to transmit, to a second wireless device, a first signal for probing an energy state of the second wireless device and to monitor for a second, backscattered signal indicating the energy state of the second wireless device; and
   a second circuit configured to transmit, to the second wireless device, an indication of time and frequency resources for harvesting energy based at least in part on monitoring for the second, backscattered signal and to transmit a third signal over the time and frequency resources that is distinct from the first signal and associated with harvesting energy.

9. The first wireless device of claim 8, wherein the first circuit is configured to transmit a plurality of probing signals to the second wireless device, wherein transmitting the indication of the time and frequency resources for harvesting energy is based at least in part on a quantity of probing signals in the plurality being above a threshold quantity and failing to detect a respective backscattered signal for each of the plurality of probing signals.

10. The first wireless device of claim 8, wherein the second circuit is configured to transmit the indication of the time and frequency resources for harvesting energy based at least in part on the energy state indicated by the second signal being below a threshold level.

11. The first wireless device of claim 8, wherein the second circuit is configured to transmit the indication of the time and frequency resources for harvesting energy based at least in part on a traffic profile associated with communication between the first wireless device and the second wireless device.

12. The first wireless device of claim 8, wherein the second circuit is configured to transmit the indication of the time and frequency resources for harvesting energy based at least in part on a type of traffic associated with the second wireless device.

13. The first wireless device of claim 8, wherein the second circuit is configured to transmit a second indication of the time and frequency resources for harvesting energy based at least in part on channel feedback associated with the second wireless device, one or more scheduled transmissions from the first wireless device, or both.

14. The first wireless device of claim 8, wherein the first circuit is configured to transmit the first signal over a first frequency band and the second circuit is configured to transmit the third signal over a second frequency band that excludes the first frequency band.

15. The first wireless device of claim 8, wherein the first circuit is configured to transmit the first signal over a same frequency band that the second circuit is configured to transmit the third signal.

16. A method for wireless communication at a first wireless device, comprising:
    receiving, from a second wireless device, a first signal for probing an energy state of the second wireless device;
    transmitting, based at least in part on receiving the first signal, a second, backscattered signal to the second wireless device, wherein the second signal indicates the energy state of the first wireless device; and receiving, from the second wireless device, an indication of time and frequency resources for harvesting energy based at least in part on transmitting the second signal that indicates the energy state of the first wireless device.

17. The method of claim 16, further comprising:
transmitting the second signal based at least in part on the energy state being above a threshold level.

18. The method of claim 16, wherein the first signal is received over a first frequency band and the indication of the time and frequency resources for harvesting energy is received over a second frequency band that excludes the first frequency band.

19. The method of claim 16, wherein the first signal is received over a same frequency band as the indication of the time and frequency resources for harvesting energy.

20. The method of claim 16, further comprising:
receiving, from the second wireless device, a first message scheduling an uplink resource; and
transmitting, to the second wireless device, a second message over the uplink resource and indicating a second energy state of the first wireless device.

21. The method of claim 16, wherein the first wireless device comprises an Internet of Things (IoT) wireless device and the second wireless device comprises a base station.

22. The method of claim 21, wherein the first wireless device comprises a user equipment (UE).

23. A method for wireless communication at a first wireless device, comprising:
transmitting, to a second wireless device, a first signal for probing an energy state of the second wireless device;
monitoring for a second, backscattered signal indicating the energy state of the second wireless device;
transmitting, to the second wireless device, an indication of time and frequency resources for harvesting energy based at least in part on monitoring for the second, backscattered signal; and
transmitting, to the second wireless device and over the time and frequency resources, a third signal distinct from the first signal and associated with harvesting energy.

24. The method of claim 23, further comprising:
transmitting a plurality of probing signals to the second wireless device, wherein transmitting the indication of the time and frequency resources for harvesting energy is based at least in part on a quantity of probing signals in the plurality being above a threshold quantity and failing to detect a respective backscattered signal for each of the plurality of probing signals.

25. The method of claim 23, further comprising:
transmitting the indication of the time and frequency resources for harvesting energy based at least in part on the energy state indicated by the second signal being below a threshold level.

26. The method of claim 23, further comprising:
transmitting the indication of the time and frequency resources for harvesting energy based at least in part on a traffic profile for a network associated with the first wireless device and the second wireless device.

27. The method of claim 23, further comprising:
transmitting the indication of the time and frequency resources for harvesting energy based at least in part on a type of traffic associated with the second wireless device.

28. The method of claim 23, further comprising:
transmitting a second indication of the time and frequency resources for harvesting energy based at least in part on channel feedback associated with the second wireless device, one or more scheduled transmissions from the first wireless device, or both.

29. The method of claim 23, wherein the first signal is transmitted over a first frequency band and the third signal is transmitted over a second frequency band that excludes the first frequency band.

30. The method of claim 23, wherein the first signal is transmitted over a same frequency band as the third signal.

31. The first wireless device of claim 1, wherein the energy state of the first wireless device indicated by the second signal is an energy storage level associated with the first wireless device.

32. The first wireless device of claim 8, wherein the energy state of the second wireless device indicated by the second signal is an energy storage level associated with the second wireless device.

* * * * *